(12) United States Patent
Santiago et al.

(10) Patent No.: US 11,298,892 B2
(45) Date of Patent: *Apr. 12, 2022

(54) EXPANDABLE TOOLING SYSTEMS AND METHODS

(71) Applicant: The Boeing Company, Chicago, IL (US)

(72) Inventors: Jonathan A. Santiago, Seattle, WA (US); Xiaoxi Wang, Mukilteo, WA (US); Gary Ernest Georgeson, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 249 days.

This patent is subject to a terminal disclaimer.

(21) Appl. No.: 16/459,492

(22) Filed: Jul. 1, 2019

(65) Prior Publication Data

US 2021/0001571 A1 Jan. 7, 2021

(51) Int. Cl.
*B29C 70/34* (2006.01)
*B29C 43/10* (2006.01)
*B29L 31/30* (2006.01)

(52) U.S. Cl.
CPC .............. *B29C 70/34* (2013.01); *B29C 43/10* (2013.01); *B29C 2043/106* (2013.01); *B29L 2031/3076* (2013.01)

(58) Field of Classification Search
None
See application file for complete search history.

(56) References Cited

U.S. PATENT DOCUMENTS

| 3,755,031 | A | 8/1973 | Hoffman et al. |
| 4,302,549 | A | 11/1981 | Crowley |
| 4,303,756 | A | 12/1981 | Kajimura et al. |
| 4,782,098 | A | 11/1988 | Allen et al. |

(Continued)

FOREIGN PATENT DOCUMENTS

| EP | 1391281 A1 | 2/2004 |
| EP | 2918388 A1 | 9/2015 |

(Continued)

OTHER PUBLICATIONS

Praller, Andreas, "Foaming Plastics with Inert Gases", Kunststoffe Plast Europe, Jun. 2005, 4 pages.

(Continued)

*Primary Examiner* — Barbara J Musser
(74) *Attorney, Agent, or Firm* — Kolisch Hartwell, P.C.

(57) ABSTRACT

Methods of manufacturing composite workpieces that include adding an expandable element to an internal volume of a constraining container proximate to a uncured composite workpiece supported on a rigid form, where the expandable element is configured to expand when a predetermined change is produced in an attribute of the expandable element; expanding the expandable element by producing the predetermined change in the attribute of the expandable element, so that an expansion of the expandable element applies pressure to the workpiece supported on the rigid form within the internal volume, and curing the composite workpiece while the resulting pressure is applied to the workpiece supported on the rigid form.

20 Claims, 12 Drawing Sheets

(56) References Cited

U.S. PATENT DOCUMENTS

| | | | | |
|---|---|---|---|---|
| 5,051,224 | A | * | 9/1991 | Donatelli .................. C08J 3/12 |
| | | | | 264/257 |
| 5,102,604 | A | * | 4/1992 | Sidles ..................... B29C 43/10 |
| | | | | 264/257 |
| 5,230,844 | A | | 7/1993 | Macaire et al. |
| 5,273,696 | A | | 12/1993 | Cazaillon et al. |
| 6,117,376 | A | | 9/2000 | Merkel |
| 7,052,572 | B2 | * | 5/2006 | Miura ..................... B29C 43/10 |
| | | | | 156/286 |
| 8,540,921 | B2 | | 9/2013 | Senibi et al. |
| 8,790,565 | B2 | | 7/2014 | Miller |
| 2005/0027555 | A1 | | 2/2005 | Forrest et al. |
| 2006/0175730 | A1 | | 8/2006 | Merkel |
| 2007/0080481 | A1 | | 4/2007 | Kismarton |
| 2008/0111024 | A1 | | 5/2008 | Lee et al. |
| 2009/0078826 | A1 | | 3/2009 | Haensch |
| 2010/0140842 | A1 | | 6/2010 | Nelson et al. |
| 2011/0308711 | A1 | | 12/2011 | Coleman et al. |
| 2012/0041086 | A1 | | 2/2012 | Sampath et al. |
| 2013/0134621 | A1 | | 5/2013 | Tsotsis et al. |
| 2014/0299257 | A1 | | 10/2014 | Pearson et al. |
| 2020/0039156 | A1 | | 2/2020 | Wang et al. |
| 2020/0148851 | A1 | | 5/2020 | Queiroz Da Fonseca et al. |
| 2020/0207033 | A1 | | 7/2020 | Wang et al. |
| 2021/0001519 | A1 | | 1/2021 | Wang et al. |
| 2021/0187876 | A1 | | 6/2021 | Wang et al. |

FOREIGN PATENT DOCUMENTS

| | | | | |
|---|---|---|---|---|
| GB | 2259667 | A | * 3/1993 | ............ B29C 70/44 |
| JP | H11300740 | A | 11/1999 | |
| JP | 2003089728 | A | 3/2003 | |
| JP | 2006028373 | A | 2/2006 | |
| JP | 2007090345 | A | 4/2007 | |
| JP | 3981299 | B2 | 9/2007 | |
| WO | 2013111368 | A1 | 8/2013 | |
| WO | 2019073848 | A1 | 4/2019 | |
| WO | 2019129686 | A1 | 7/2019 | |

OTHER PUBLICATIONS

The Linde Group, "Facts About Foaming Plastics with Inert Gases", Linde North America, Inc. Brochure, 2012, 12 pages.

Akzo Nobel NV, Expancel Microspheres: The World's Favorite Secret Ingredient, 2016, 16 pages.

Akzo Nobel NV, Product Specification for Expancel Microspheres, Expancel MB, Nov. 2017, 2 pages.

Easy Composite Ltd., Beginner's Guide to Out of Autoclave Carbon Fibre, downloaded from Internet on May 5, 2019, at https://www.easycomposites.co.uk/downloads/TDS/EC-TDS-Beginners-Guide-to-Prepreg-Carbon-Fibre.pdf, 21 pages.

U.S. Patent and Trademark Office, Non-Final Office Action regarding U.S. Appl. No. 16/053,733, dated Sep. 3, 2020, 20 pages.

U.S. Patent and Trademark Office, Final Office Action regarding U.S. Appl. No. 16/053,733, dated Dec. 16, 2020, 14 pages.

European Patent Office, Partial European Search Report regarding European Patent Application No. 20215427.4, dated May 14, 2021, 13 pages.

European Patent Office, Extended European Search Report regarding European Patent Application No. 20215427.4, dated Aug. 27, 2021, 12 pages.

U.S. Patent and Trademark Office, Non-Final Office Action regarding U.S. Appl. No. 16/459,505, dated Sep. 2, 2021, 37 pages.

* cited by examiner

US 11,298,892 B2

EXPANDABLE TOOLING SYSTEMS AND METHODS

CROSS-REFERENCE TO RELATED APPLICATIONS

The present application hereby incorporates by reference, for all purposes, U.S. patent application Ser. No. 16/053,733, filed Aug. 2, 2018 by The Boeing Company and issued as U.S. Pat. No. 11,046,027 on Jun. 29, 2021.

FIELD

This disclosure relates to systems and methods for manufacturing composite parts. More specifically, the disclosed examples relate to composite part manufacture using expandable tooling.

Introduction

Engineered composite materials are used in many applications, typically where the composite material can be made stronger, lighter, and/or less expensively than a traditional material. A variety of modern composite materials exist, but the most common are varieties of fiber-reinforced polymer composites, such as fiberglass or carbon fiber composites.

For many composite materials, the manufacturing process includes curing the fiber-reinforced matrix material, typically under elevated temperatures and pressures. An industrial autoclave is often used for curing composite materials, as autoclaves permit the application of both temperature and pressure under controlled conditions.

Unfortunately, for processes requiring an autoclave, a bottleneck may be created in the manufacturing process, with throughput dependent upon the capacity of the autoclaves available, and requiring transport of either raw materials or preassembled but uncured components to the autoclave, and subsequent transport of the cured components from the autoclave to where they will be utilized.

So-called "Out of Autoclave" composite manufacturing (or OOA) provides an alternative to traditional industrial curing processes typically used for composite manufacture. An ideal OOA curing process would achieve the same quality of composite component as an industrial autoclave, without requiring treatment within a traditional autoclave.

SUMMARY

The present disclosure provides systems, apparatus, and methods relating to expandable tooling for curing composite structures.

In some examples, the present disclosure relates to methods of manufacturing a composite workpiece that include adding an expandable element to an internal volume of the constraining container proximate to an uncured composite workpiece supported on a rigid form, where the unexpanded element is configured to expand when a predetermined change is produced in an attribute of the unexpanded element; expanding the expandable element by producing the predetermined change in the attribute of the unexpanded element so that an expansion of the expandable element applies a resulting pressure to the workpiece supported on the rigid form within the internal volume; and curing the composite workpiece while the resulting pressure is applied to the workpiece supported on the rigid form.

In some examples, the present disclosure relates to methods of manufacturing a composite component that include adding a thermally-activated expandable element to an internal volume of a constraining container housing an uncured composite component supported on a rigid form; expanding the thermally-activated expandable element by heating the thermally-activated expandable element to at least a predetermined temperature; and curing the composite component within the internal volume of the constraining container while the expanded element applies pressure to the uncured component.

Features, functions, and advantages can be achieved independently in various examples of the present disclosure, or can be combined in yet other examples, further details of which can be seen with reference to the following description and drawings.

DETAILED DESCRIPTION

Figure 2:
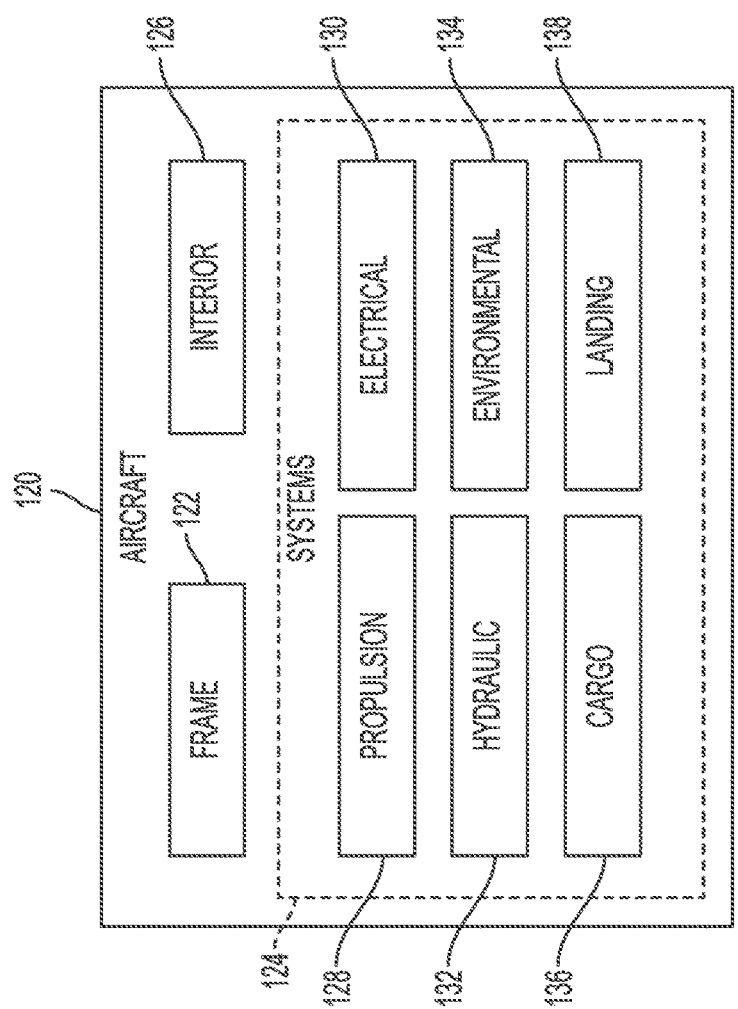
FIG. 2 is a schematic diagram of an illustrative aircraft.

Various aspects and examples of an expandable tooling system, as well as related methods, are described below and illustrated in the associated drawings. Unless otherwise specified, an expandable tooling system, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein may be included in other similar devices and methods, including being interchangeable between disclosed examples. The following description of various examples is merely illustrative in nature and is in no way intended to limit the examples, their applications, or their uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Illustrative Combinations and Additional Examples; (5) Advantages, Features, and Benefits; and (6) Conclusion.

Definitions

The following definitions apply herein, unless otherwise indicated.

"Substantially" means to be predominantly conforming to the particular dimension, range, shape, concept, or other aspect modified by the term, such that a feature or component need not conform exactly, so long as it is suitable for its intended purpose or function. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, in the order they are introduced in a particular context and are not intended to show serial or numerical limitation, or be fixed identifiers for the group members.

"Coupled" means to be in such relation that the performance of one influences the performance of the other, may include being connected, either permanently or releasably, whether directly or indirectly through intervening components, and is not necessarily limited to physical connection(s).

"Expandable" means able to be expanded, or having the potential or capability of increasing in size and/or volume. A substance or discrete element that is expandable may be capable of increasing in size or volume symmetrically, or asymmetrically. Where the expandable substance is capable of symmetric expansion, the substance undergoes an a substantially equivalent degree of expansion along each axis. Where the expandable substance exhibits asymmetric expansion, the substance can undergo a greater relative expansion along a first axis, or first and second axes, than along a different axis.

Overview

In general, an expandable tooling system includes an expandable element configured to apply positive pressure to a composite workpiece during the process of curing the workpiece. Typically, the uncured composite workpiece is disposed upon, or supported by, a rigid form which, in turn, is placed within an internal volume of a constraining container. The expandable element is then added to the internal volume of the constraining container so that it is at least proximate to the uncured composite workpiece, and on the opposing side from the rigid form.

Prior to and/or during the curing process, the unexpanded element is caused to expand such that it applies pressure to the interior surfaces of the constraining container, as well as the surface of the uncured composite workpiece. The expanded element typically applies the pressure resulting from the expansion of the expandable element to the composite workpiece during some or all of the curing process to facilitate consolidation. After the part has been cured, the expanded element can be removed from the constraining container prior to, simultaneously with, or after the cured composite workpiece is removed from the constraining container.

By employing constraining containers that are minimally larger than the uncured composite workpiece, the amount of expandable element can be minimized. Simultaneously, the use of such constraining containers for applying pressure to the uncured composite workpiece permits composite manufacturing to occur without the necessity of employing an industrial autoclave.

The expandable element is typically configured to expand when a predetermined change is produced in the expandable element. The predetermined change is typically a change in a physical property or chemical property or any combination thereof, and/or any other suitable property of the expandable element that is associated with expansion of the expandable element. Unless otherwise specified, expansion of the expandable element refers to an increase in the volume of the expandable element, surface area of the expandable element, and/or spatial extent of the expandable element in one or more dimensions. For example, the expandable element can be configured to expand when the temperature of the element is raised from a lower temperature, such as an ambient temperature, to a predetermined higher temperature. Accordingly, in cases in which curing the workpiece includes raising the temperature of the workpiece, the expandable element expands inside the internal volume during the curing process. The expanding or expanded element exerts pressure against the interior of the constraining container as well as the uncured composite workpiece during the curing process.

The expandable element can be selected so that upon expansion within the interior of a constraining container, the expanding element exerts sufficient pressure to effectively consolidate a composite material as it cures. For some composite materials, an applied pressure of less than 1 atmosphere can be sufficient for consolidation and curing, while other composite materials can be more effectively cured at an applied pressure of 1 atmosphere or greater. The expandable element can be selected to exert sufficient pressure that pressures can be applied that have typically previously required an autoclave (for example, 1-5 atmospheres).

In one aspect, the curing process is simplified and facilitated by adding the expandable element as a plurality of expandable pellets, where the expandable pellets are configured to undergo volumetric expansion when heated to at least the predetermined temperature. The expandable element can comprise one or more expandable pellets (also called expandable beads) each configured to expand (e.g., to a predetermined volume) when heated to a predetermined temperature. For example, the composition of the expandable pellets can be designed to achieve a desired relationship between the volume of each expandable pellet and the temperature of the expandable pellet as a function of time.

The extent of the expansion of a given expandable pellet composition can be measured and recorded, as can the forces generated by the expansion. The formulation of the pellet composition can therefore be varied in order to obtain a desired degree of expansion and expansion force. In this way, the number and composition of expandable pellets employed can be selected such that the expansion of the plurality of expandable pellets within the known volume will apply a desired pressure upon the uncured composite workpiece at one or more stages of the curing process. After the composite workpiece has been cured, the expanded pellets can be easily removed from the constraining container.

The disclosed systems and methods are useful for a variety of composite materials, used in manufacturing desired components for any suitable industrial application. The presently described systems and methods are particularly useful for out-of-autoclave manufacturing of composites, such as may be desirable at a large or a remote worksite. The presently described systems and methods are additionally useful for the manufacture of components having a unique or awkward shape that may not readily be processed in an industrial autoclave.

Composite stiffeners or stringers, for example, are typically applied to fuselage sections and wing skins, in order to confer stiffness and strength to the aircraft panels to which they are attached while economizing on weight. For strength and rigidity, a stiffener may exhibit a concave cross-section with projecting extensions. The stiffener may additionally incorporate an overall curvature in order to match the curve of the fuselage to which it will be attached. Yet further, the stiffener may include one or more bends, or joggles, in order to accommodate one or more aircraft systems. Due to these constraints, the resulting stiffener may have a size and shape that makes it difficult to transport to and from an industrial autoclave, or may even prevent the autoclave from accommodating the uncured stiffener.

However, such a composite stiffener can be readily accommodated by a constraining container specifically sized and shaped for that stiffener, and the uncured composite stiffener can be disposed upon a rigid form constructed so as to define and incorporate the desired cross-sectional profile, the desired curvature, and the desired joggles in the stiffener. The composite stiffener can then readily be cured while disposed upon the rigid form while the requisite pressure is applied to the composite by a suitable expandable element.

Examples, Components, and Alternatives

The following sections describe selected aspects of exemplary removable expandable tooling, as well as related systems and/or methods. The examples in these sections are intended for illustration and should not be interpreted as limiting the entire scope of the present disclosure. Each section can include one or more distinct embodiments or examples, and/or contextual or related information, function, and/or structure.

A. Illustrative Applications and Associated Methods

The presently disclosed systems and methods may be used in any suitable industry, for the manufacture of any desired composite material. Although the examples provided herein are described in the context of aircraft manufacturing and service, these are merely illustrative examples, and should not be considered limiting the applicability of the disclosed systems and methods in any way.

Figure 1:
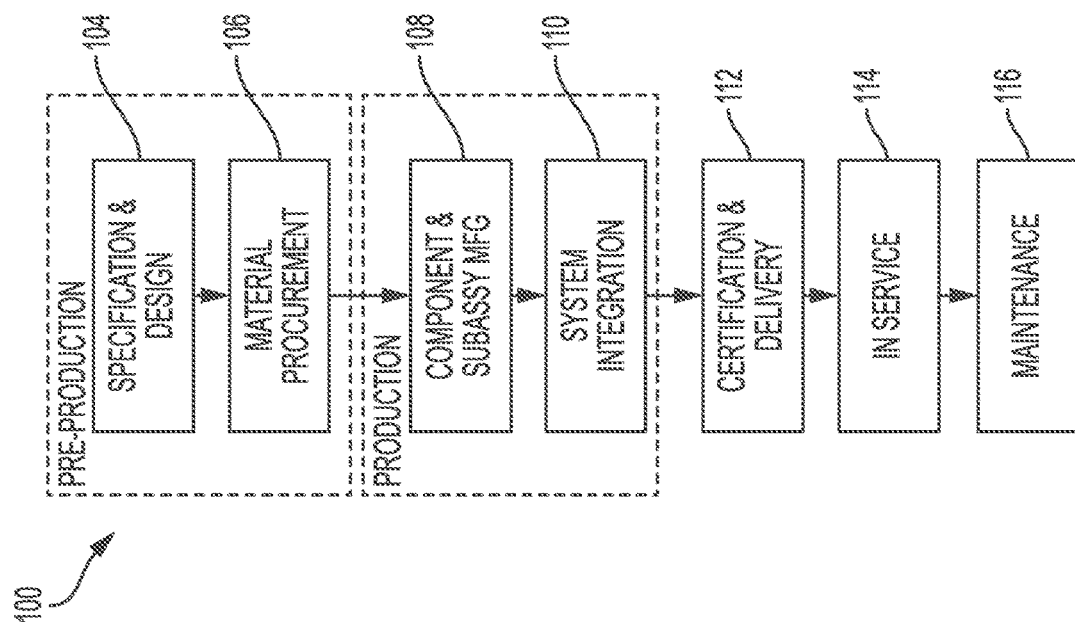
FIG. 1 is a flowchart depicting steps of an illustrative aircraft manufacturing and service method.
Figure 3:
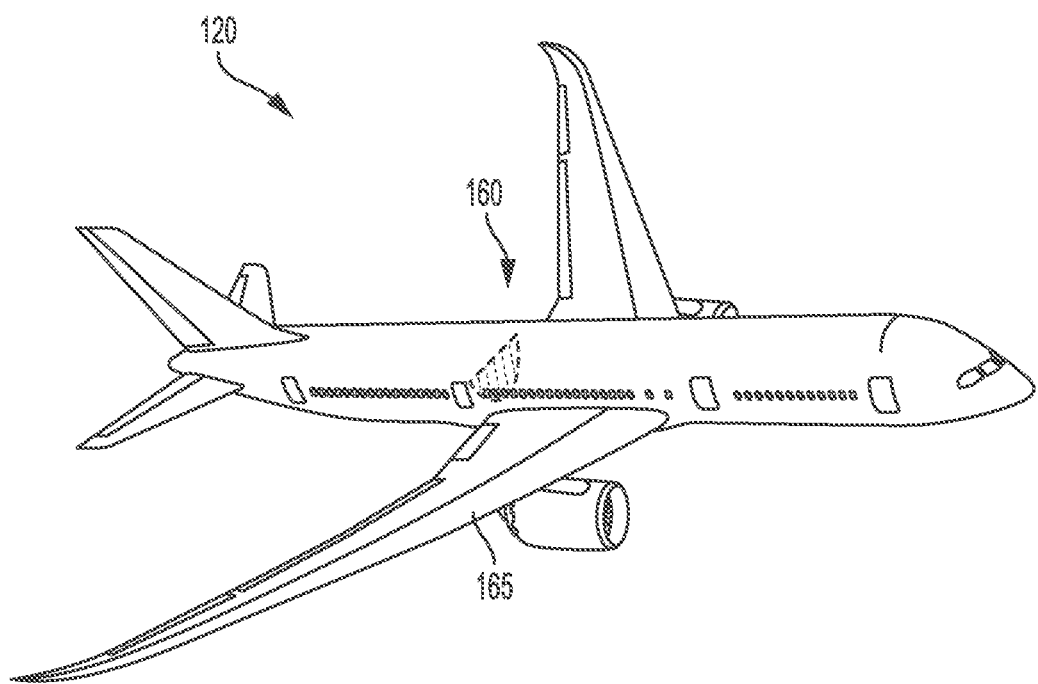
FIG. 3 is an isometric view of an illustrative aircraft.

FIGS. 1-3 depict an illustrative aircraft manufacturing and service method 100 and an illustrative aircraft 120. Method 100 includes a plurality of processes, stages, or phases. During pre-production, method 100 can include a specification and design phase 104 of aircraft 120 and a material procurement phase 106. During production, a component and subassembly manufacturing phase 108 and a system integration phase 110 of aircraft 120 can take place. Thereafter, aircraft 120 can go through a certification and delivery phase 112 to be placed into in-service phase 114. While in service (e.g., by an operator), aircraft 120 can be scheduled for routine maintenance and service 116 (which can also include modification, reconfiguration, refurbishment, and so on of one or more systems of aircraft 120). While the examples described herein relate generally to component and subassembly manufacturing phase 108 of aircraft 120, they can be practiced at other stages of method 100.

Each of the processes of method 100 can be performed or carried out by a system integrator, a third party, and/or an operator (e.g., a customer). For the purposes of this description, a system integrator can include, without limitation, any number of aircraft manufacturers and major-system subcontractors; a third party can include, without limitation, any number of vendors, subcontractors, and suppliers; and an operator can be an airline, leasing company, military entity, service organization, and so on.

As shown in FIGS. 2-3, aircraft 120 produced by illustrative method 100 can include a frame 122 with a plurality of systems 124 and an interior 126. Examples of plurality of systems 124 include one or more of a propulsion system 128, an electrical system 130, a hydraulic system 132, an environmental system 134, a cargo system 136, and a landing system 138. Each system can comprise various subsystems, such as controllers, processors, actuators, effectors, motors, generators, etc., depending on the functionality involved. Any number of other systems can be included. Although an aerospace example is shown, the principles disclosed herein can be applied to other industries, such as the automotive industry, rail transport industry, and nautical transport industry. Accordingly, in addition to aircraft 120, the principles disclosed herein can apply to other structures, such as other vehicles, e.g., land vehicles, marine vehicles, etc.

Apparatuses and methods shown or described herein can be employed during any one or more of the stages of the manufacturing and service method 100. For example, components or subassemblies corresponding to component and subassembly manufacturing phase 108 can be fabricated or manufactured in a manner suitable for components or subassemblies used while aircraft 120 is operating during in-service phase 114. Also, one or more examples of the apparatuses, methods, or combinations thereof can be utilized during production stages 108 and 110, for example, by substantially expediting assembly of or reducing the cost to manufacture or use aircraft 120. Similarly, one or more examples of the apparatus or method realizations, or a combination thereof, can be utilized, for example and without limitation, during maintenance and service phase 116.

Any component or substructure of an aircraft that lends itself to composite manufacture can be compatible with the illustrative methods and processes described herein, including without limitation structural components, fuselage panels, bulkhead sections, and the like. In one aspect, the presently described methods are particularly useful for the manufacture of stiffeners, or stringers, used in aircraft manufacture.

Figure 4:
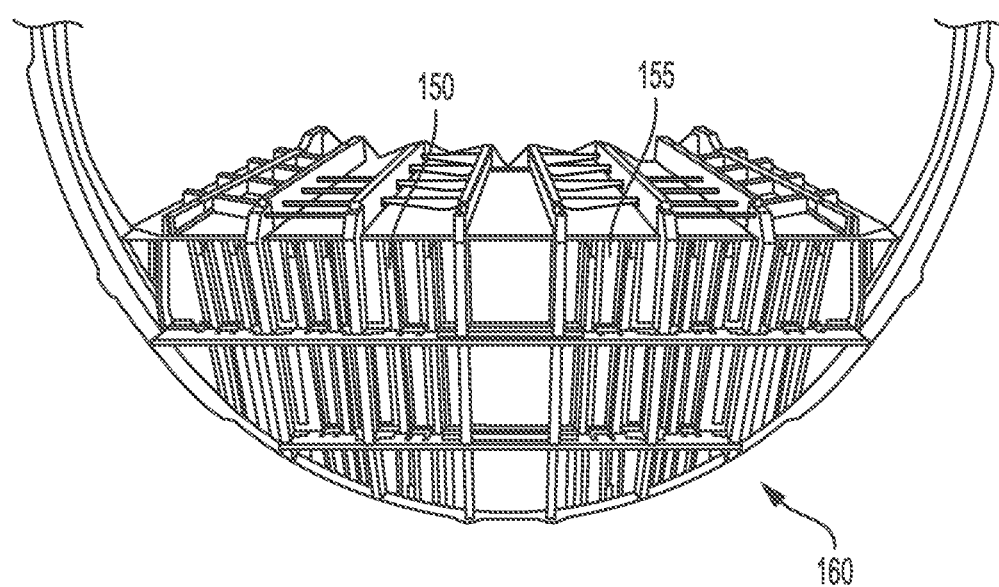
FIG. 4 is a back perspective view of a portion of an illustrative aircraft bulkhead including illustrative stiffeners.
Figure 5:
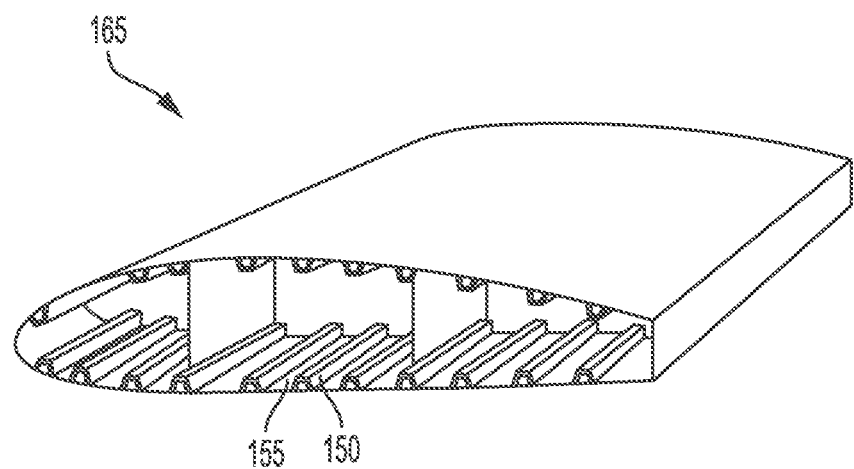
FIG. 5 is a perspective view of a portion of an illustrative aircraft wing including stiffeners.

As shown in FIGS. 3-5, an aircraft 120 can include one or more stiffeners 150 configured to carry loads. In some examples, stiffeners 150 are attached to skins 155 to improve the strength, stiffness, and/or buckling resistance of the skins. Stiffeners 150 can be included in any suitable part of aircraft frame 122 and/or any other suitable part of aircraft 120. FIGS. 3-4 depict stiffeners 150 reinforcing skin 155 in an illustrative aircraft bulkhead 160. FIG. 5 depicts stiffeners 150 reinforcing skin 155 in an illustrative aircraft wing 165.

B. Illustrative Aircraft Stiffener

Figure 6:
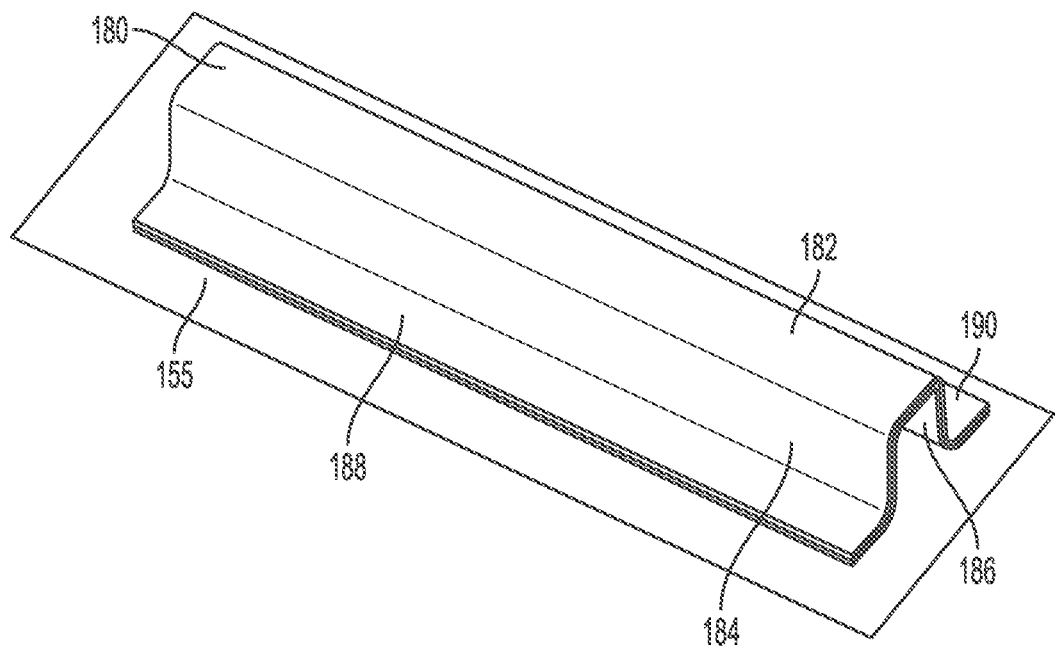
FIG. 6 is a perspective view of an illustrative composite aircraft hat stiffener attached to a skin.
Figure 7:
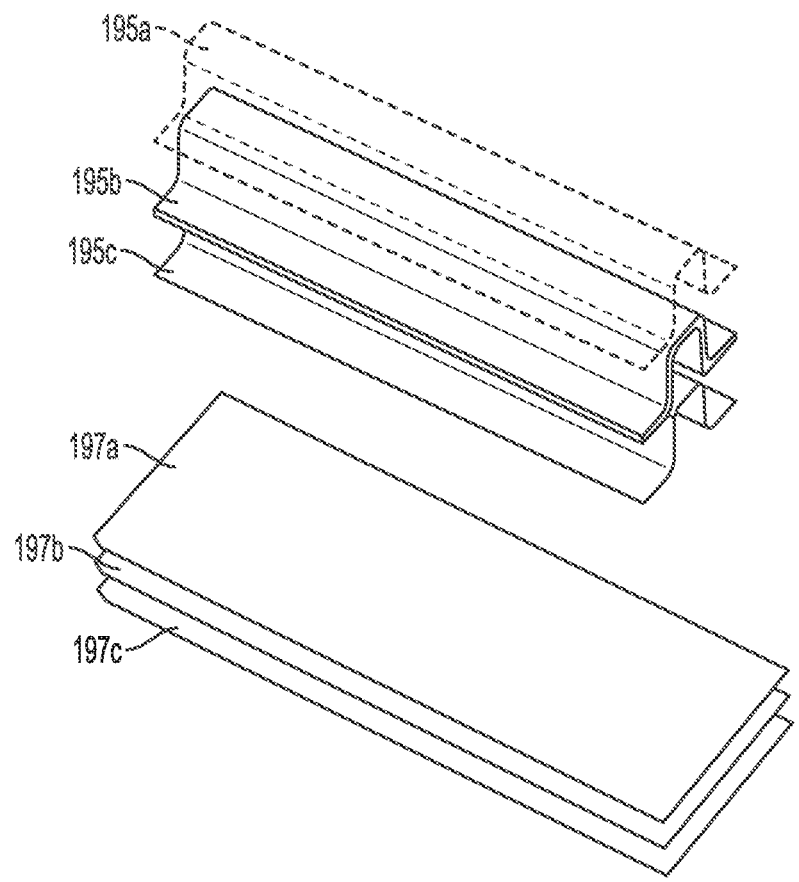
FIG. 7 is an exploded isometric view of the stiffener and skin of FIG. 6.

This section describes illustrative hat stiffener 180, as shown in FIGS. 6-7. Hat stiffener 180 is an example of stiffener 150, described above.

As depicted in FIG. 6, hat stiffener 180 includes a cap section 182 and first and second sidewalls 184 and 186 extending from opposing side portions of the cap section. In the example depicted in FIG. 6, first and second sidewalls 184 and 186 extend from cap section 182 at obtuse angles; in other examples, first and second sidewalls 184 and 186 can form acute angles or substantially right angles with cap section 182. The angle between cap section 182 and first sidewall 184 may or may not be equal to the angle between cap section 182 and second sidewall 186. Cap section 182 can be substantially planar, as depicted in FIG. 6, or can include curved and/or angled portions.

Hat stiffener 180 further includes first flange 188 extending from first sidewall 184, and second flange 190 extending from second sidewall 186. First and second flanges 188 and 190 extend away from each other in opposing directions and can be parallel to cap section 182 (e.g., the first and second flanges can be coplanar and can define a plane that is parallel to a plane generally defined by the cap section). First and second flanges 188 and 190 have respective bottom surfaces that can be attached to skin 155 so that hat stiffener 180 is configured to reinforce, stiffen, and strengthen the skin. A plurality of hat stiffeners 180 can be attached to an expanse of skin 155.

Hat stiffener 180 is a composite part comprising one or more composite layers (also called plies) that are adhered together by curing (e.g., by application of heat and/or pressure). Skin 155 can also be a composite part comprising one or more composite layers. FIG. 7 is an exploded view depicting illustrative composite stiffener layers 195a, 195b, and 195c of hat stiffener 180 and illustrative composite skin layers 197a, 197b, and 197c of skin 155. Alternatively, hat stiffener 180 and/or skin 155 can comprise more composite layers, or fewer composite layers, than are depicted in FIG. 7. Hat stiffener 180 can be attached to skin 155 by curing the stiffener and the skin while they are held together, or by curing the stiffener and the skin separately and then fastening the stiffener to the skin. Hat stiffener 180 and skin 155 can each comprise one or more polymer materials, thermoplastic materials, thermosetting materials, and/or any other suitable materials depending on the desired properties for the finished workpiece.

Figure 8:
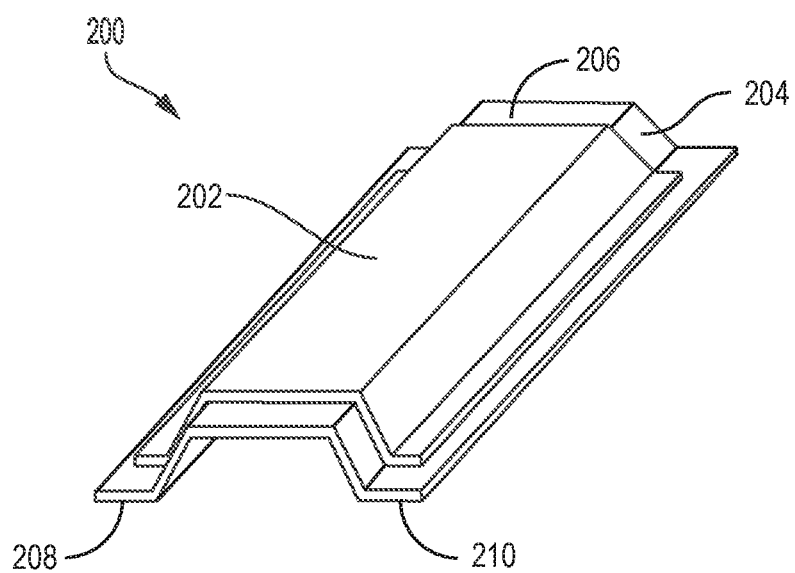
FIG. 8 depicts an illustrative workpiece assembly including an uncured composite workpiece disposed upon a rigid form.
Figure 9:
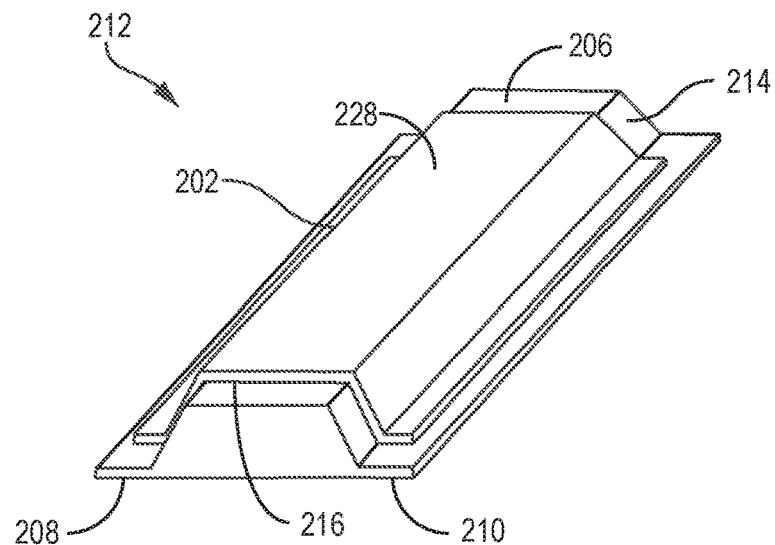
FIG. 9 depicts an illustrative workpiece assembly including an uncured composite workpiece disposed upon a rigid form.

FIG. 8 schematically depicts an assembly 200 that includes an uncured composite workpiece 202 corresponding to an aircraft stiffener, where the uncured composite workpiece 202 is disposed upon an appropriately-shaped rigid form 204. In this example the upper surface 206 of rigid form 204 defines the desired cross-sectional profile of the desired final stiffener, including extensions 208 and 210 to support what will become first flange 188 and second flange 190, respectively. Although rigid form 204 defines a concave shell, any configuration of rigid form having a suitable upper surface upon which the shape of the desired composite workpiece can be formed is an appropriate configuration. For example as shown for assembly 212 of FIG. 9, rigid form 214 can include a solid form, rather than a concave shell.

Rigid form 214 can be substantially resistant to compression, at least when pressure is applied on upper surface 206 of the rigid form, which contacts an undersurface 216 of uncured composite workpiece 202. In this way pressure applied to the outer surface 228 of uncured composite workpiece 202 acts cooperatively with rigid form 204, 214 to generate compressive force upon workpiece 202.

Rigid form 214 can perform the function of a conventional caul plate, or can be used in conjunction with a conventional caul plate.

C. Expandable Tooling System Overview

Figure 10:
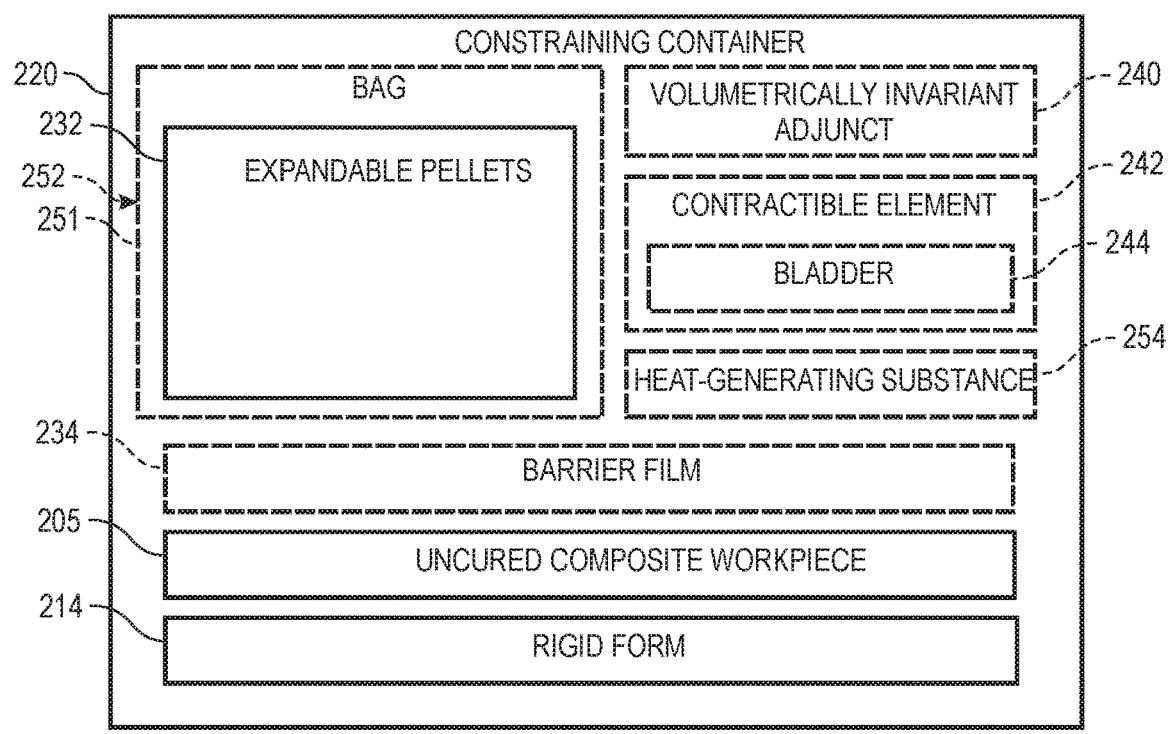
FIG. 10 is an illustrative functional block diagram depicting a constraining container according to the present disclosure, enclosing an uncured composite workpiece disposed upon a rigid form, in the presence of expandable pellets.

FIG. 10 depicts a functional block diagram illustrating a constraining container 220 that encloses a workpiece assembly 212 that includes an uncured composite workpiece 205 disposed upon a rigid form 214, and that is optionally covered by a barrier film 234. Constraining container 220 also includes expandable pellets 232 that are configured to expand when a predetermined change is produced in an attribute of the expandable pellets and to thereby exert pressure upon workpiece assembly 212, and so upon uncured composite workpiece 205.

Constraining container 220 can optionally further include one or more additional elements selected to facilitate or modify the curing process of workpiece 205, such as one or more bags 251 that can enclose expandable pellets 232 to form one or more bag assemblies 252, thereby facilitate handling of expandable pellets 232, as well as the removal of expanded pellets after curing is complete.

Additional elements that may modify or moderate the pressures applied by expandable pellets 232 can include one or more volumetrically invariant (i.e. substantially noncompressible) adjuncts 240, and/or one or more contractible elements 242 (optionally include a fluid-filled bladder 244), which can be reduced in volume after curing to facilitate access to workpiece assembly 212.

Where expandable pellets 232 are thermally-expandable pellets, constraining container 220 can be heated externally. Alternatively or in addition, constraining container 220 can include one or more heat-generating substances 254 configured to heat expandable pellets 232 to a predetermined temperature at which the pellets will expand.

One or more of the optional additional elements shown in FIG. 10 may be present in constraining container 220, without limitation, and in any combination, as will be discussed in greater detail below.

D. Expandable Element

Figure 11:
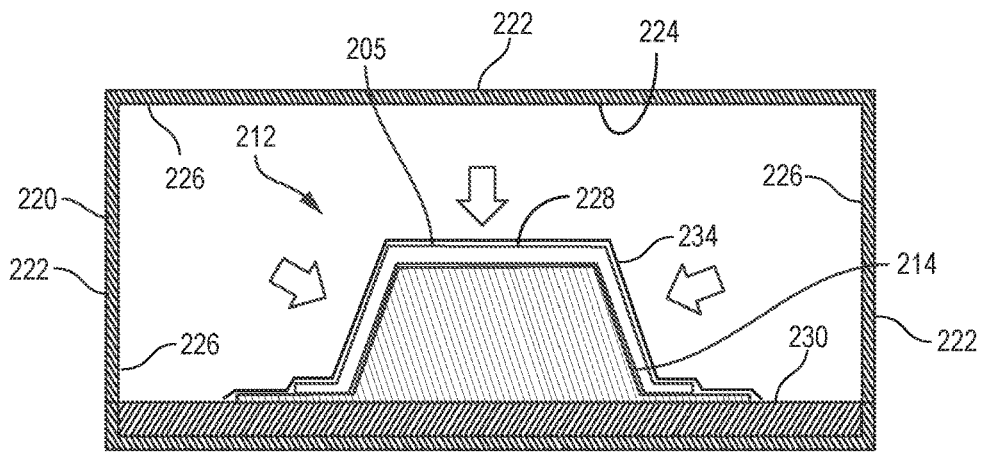
FIG. 11 is a cross-sectional view of the illustrative workpiece assembly of FIG. 9 disposed within an illustrative constraining container.
Figure 12:
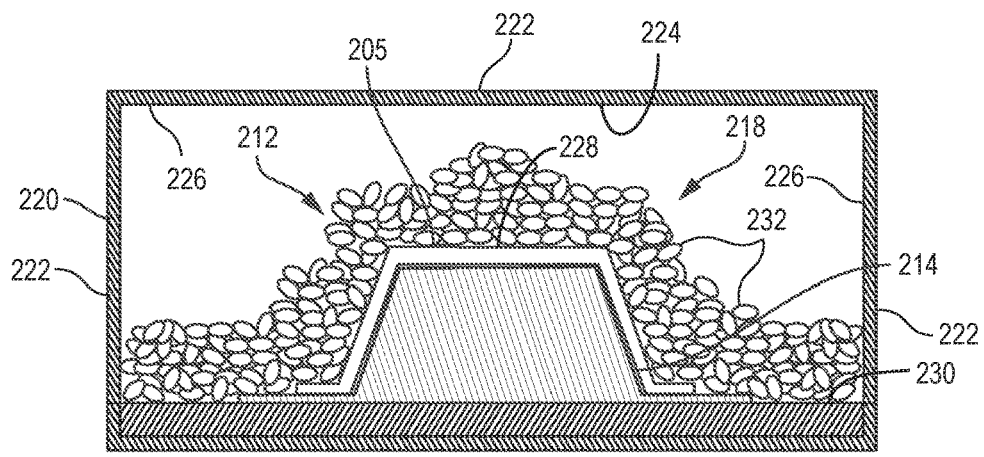
FIG. 12 is a cross-sectional view of the workpiece assembly and constraining container of FIG. 11 with the addition of an expandable element in the form of multiple pellets.
Figure 13:
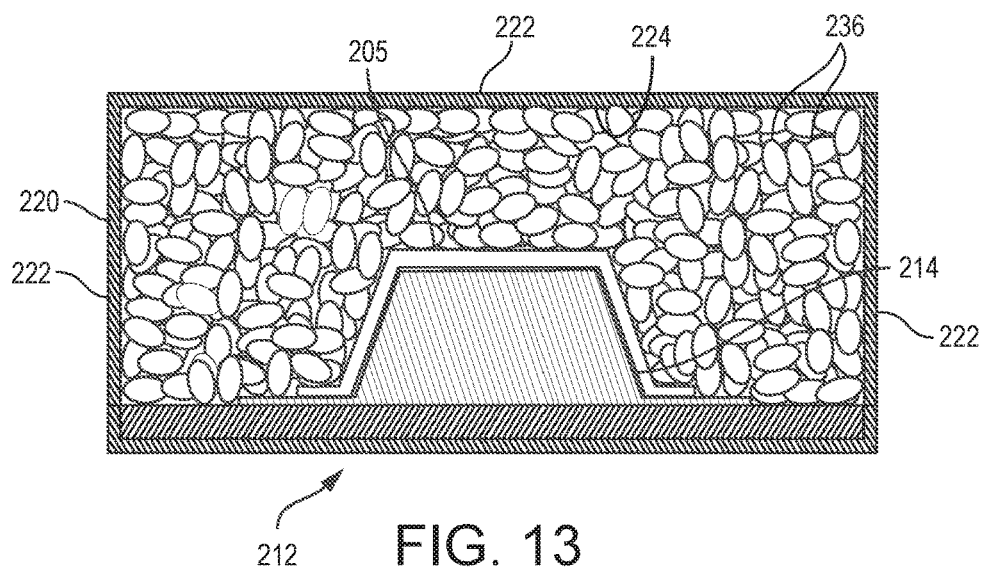
FIG. 13 is a cross-sectional view of the workpiece assembly and constraining container of FIG. 12 after expansion of the expandable pellets.

FIGS. 11-13 semi-schematically depict the components shown in the block diagram of FIG. 10. FIG. 11 schematically depicts workpiece assembly 212 of FIG. 9, including uncured composite workpiece 202 disposed upon rigid form 214. Assembly 212 is disposed within an exemplary constraining container 220, where container 220 is constructed so as to facilitate the application of pressure upon uncured composite workpiece 205 by the expansion of an expandable element. Constraining container 220 is configured to enclose assembly 212, so that container walls 222 define a volume 224 within the constraining container and intermediate the inner surfaces 226 of container walls 222 and the outer surface 228 of uncured composite workpiece 205. The addition of an expandable element to container volume 224, in an amount sufficient to make contact with both uncured composite workpiece 205 and inner surfaces 226 permits the generation and application of pressure upon surface 228 of workpiece 205 when the expandable element is expanded.

Constraining container 220 is typically constructed so that the addition of workpiece assembly 212 and subsequent addition of expandable element 218 is facilitated, as well as removal of the expanded element and workpiece after curing is completed. Container 220 can incorporate a removable upper surface, or lid, or feature one or more removable panels to provide access to the interior of the container. Any type of sealable opening is an appropriate opening, provided that when it is sealed, the container can withstand the pressure generated within the container.

In one aspect, constraining container 220 can be prepared using a variety of a cement, a plaster, or a concrete. The creation of inexpensive molded containers using cement, plaster, or concrete can help reduce the cost of composite manufacture, as the materials used for such containers can be inexpensive, and would not require sophisticated tooling to prepare. Alternatively, constraining container 220 can include multiple parts, such as a base, walls, and cover, and the multiple parts of container 220 are assembled and/or clamped together to form constraining container 220.

Alternatively, constraining container 220 can be comprised of multiple parts, such that when disassembled, enhanced access is provided to rigid form 214, for example to assist in the layup of uncured composite workpiece 205. Upon assembly of workpiece 205, constraining container 220 can be partially or fully assembled. In one aspect, constraining container 220 is partially assembled, and only fully assembled after the addition of expandable element 218. Alternatively, or in addition, constraining container 220 can be configured so that it can be conveniently used to effect repair of composite materials in the field.

In order for appropriate compressive forces to be applied to uncured composite workpiece 205 while it is within constraining container 220, rigid form 214 can be well-supported either by a substantially non-compressible surface, or alternatively, by another source of compressive force to be applied against the underside of rigid form 214. As shown in FIG. 11, it can be sufficient for rigid form 214 to be supported by the lower wall of container 220, or to be supported by a substantially noncompressible floor 230. Alternatively, the assembly of workpiece and rigid form can be disposed on a layer of an expandable element, as well as proximate to the workpiece, so as to effectively apply pressure from expanding the expandable element on all sides of the workpiece and form. In yet another aspect, rigid form 214 can be incorporated into the structure of container 220 itself. That is, rigid form 214 can be a portion of, or an extension of, a lower surface of container 220, for example.

Expandable element 218 can take any suitable form, without limitation. The expandable element can be added to constraining container 220, for example, as a powder or a foam. Alternatively, or in addition, the expandable element can be added to container 220 as discrete portions of a solid or semi-solid, such as layers of an expandable element which can be draped across assembly 212, or as smaller portions such as pellets, or beads. Where expandable element 218 is used in the form of smaller solid or semi-solid portions, expandable element 218 can be added to container 220 by adding individual sacks or bags of pellets, beads, or other smaller portions. Although FIGS. 12-13 depict the expandable element as a plurality of pellets 232, this is a representative depiction and should not be considered in any way limiting.

In one aspect, the curing process of the composite workpiece further includes applying a removable barrier film 234 to an outer surface of the uncured composite workpiece before adding expandable element 218 to internal volume 224 of constraining container 220. In this aspect, selected chemical and/or physical interactions between expandable element 218 and workpiece 205 can be minimized and/or eliminated by the presence of barrier film 234, which is shown in FIG. 11. Barrier film 234 can be selected to be resistant to heat, and to be readily removable after workpiece 205 is cured. Appropriate materials for barrier film 234 can include silicon-based films, polymer-based films, and/or fluorinated polymer-based films.

In one aspect, barrier film 234 is incorporated into a vacuum bag that contains workpiece 205. In this aspect barrier film 234 may be used to reduce the porosity of the surface of workpiece 205, and additionally or alternatively may be used to further consolidate workpiece 205 during curing by evacuating the vacuum bag while expandable element 218 is applying pressure to the workpiece.

Typically, expandable element 218 is added to an internal volume 224 of constraining container 220 while the expandable element is in an unexpanded state, as shown in FIG. 12. Prior to and/or during the curing process, expandable element 218 is made to expand (e.g., to increase in volume) to at least partially fill volume 224, such that the expanded expandable element applies positive pressure directly or indirectly to at least some inner surfaces 226 of constraining container 220 as well as the upper and outer surface of uncured workpiece 205. The pressure exerted by element 218 as it expands thereby helps to compress and consolidate workpiece 205 as it is cured.

Expandable element 218 can be configured to expand (e.g., to a predetermined volume and/or pressure) when a predetermined change is produced in an attribute of the unexpanded element. Typically, expandable element 218 is inserted into container volume 224 in an unexpanded state, the predetermined change is produced in the attribute of the unexpanded element while the unexpanded element is within volume 224, and the unexpanded element expands in response to the produced predetermined change. The attribute of expandable element 218 can be a physical and/or chemical attribute.

In one aspect, the expandable element 218 can be configured to expand in volume when it interacts with water. For example, where the expandable element 218 is or includes a desiccant, the desiccant can increase in volume as water is absorbed. For example, anhydrous calcium sulfate (anhydrite) can exhibit an increase in volume of 61% when it absorbs water to form gypsum.

Water can be added to expandable element 218 directly, such as by adding liquid water or water vapor to the interior of constraining container 220. Alternatively, or in addition, water or water vapor can be generated within container 220 itself, for example by an appropriate chemical reaction.

In one aspect, the predetermined change in an attribute of the unexpanded element includes a change in the temperature of expandable element 218 and/or the temperature of one or more portions of the expandable element. Accordingly, producing the predetermined change in the attribute of expandable element 218 can include raising the temperature of the unexpanded expandable element from a lower temperature, such as an ambient temperature (e.g., room temperature), to at least a predetermined temperature greater than the initial or ambient temperature (e.g., the predetermined temperature is a number of degrees above the ambient temperature suitable to produce a predetermined expansion of the expandable element). The expandable element then undergoes thermal expansion as a result of the increase in temperature.

In this aspect, the curing process can include adding a thermally-activated expandable element to the internal volume 224 of the constraining container 220, where the thermally-activated expandable element is configured to expand when the temperature of the element is raised to at least a predetermined temperature.

Alternatively, or in addition, expanding the thermally-activated expandable element by heating the thermally-activated expandable element to at least a predetermined temperature can include producing a predetermined pressure against the uncured composite workpiece when the thermally-activated expandable element is heated to at least the predetermined temperature. Typically, the predetermined pressure is a pressure sufficient to adequately cure the composite material.

The predetermined change produced in the attribute of the unexpanded element can be a combination of two or more properties of expandable element 218, such as a ratio or a product of quantitative values associated with properties of the expandable element, such as two materials that have different coefficients of thermal expansion.

The process of curing workpiece 205 can include producing the predetermined change in the attribute of expandable element 218. Therefore, the expansion of expandable element 218 can occur automatically during the curing process. For example, the attribute can be a temperature of expandable element 218, and heat applied to assembly 212 during the curing process can produce the predetermined change in the temperature of the expandable element. That is, heat applied to assembly 212 during the curing process can raise the temperature of expandable element 218 to at least a predetermined temperature associated with a desired volume and/or desired increase in volume. One or more properties of expandable element 218 can be designed such that the temperature change induced in the expandable element during the curing of workpiece 205 causes the expandable element to expand a desired predetermined amount as a result of thermal expansion. Alternatively, or additionally, causing expandable element 218 to expand can require additional steps beyond those required to cure workpiece 205. For example, causing expandable element 218 to expand can include applying an electric field, injecting a liquid, gas, and/or another suitable material, and/or inducing any other suitable change in the expandable element.

As mentioned, expandable element 218 can have the form of a plurality of pellets 232. In one aspect, pellets 232 can include foamable pellets configured to foam when heated to at least a predetermined foaming temperature. Pellets 232 can include a foamable material, e.g., a thermoplastic material treated with a blowing agent; a gas-filled balloon; hollow microspheres, a metal; any other suitable component configured to expand when heated, or any combination thereof.

Thermally-expandable pellets 232 can comprise any material capable of undergoing expansion when the predetermined foaming temperature is reached. In particular, a family of plastic polymers capable of softening when heated are called thermoplastic materials. When heated above its glass transition temperature and below its melting point, a solid thermoplastic material softens, becoming a viscous liquid. In this state, thermoplastics can be reshaped, and more specifically, can be expanded.

A variety of classes of thermoplastic materials are known, including acrylic polymers, acrylonitrile butadiene styrene (ABS) polymers, nylon polymers, polylactic acid (PLA) polymers, polybenzimidazole polymers, polycarbonate polymers, polyether sulfone (PES) polymers, polyetherimide (PEI) polymers, polyethylene (PE) polymers, polyphenylene oxide (PPO) polymers, polyphenylene sulfide (PPS) polymers, polyvinyl chloride (PVC) polymers, polyvinylidene fluoride (PVDF) polymers, and polytetrafluoroethylene (PTFE) polymers, among others. In particular, expandable pellets 232 that include acrylonitrile butadiene styrene (ABS) polymers can exhibit favorable physical properties when used in conjunction with the systems described herein.

Expandable pellets 232 can additionally include a blowing agent. Typically, a blowing agent is selected so that, when heated to at least a predetermined temperature, it forms a plurality of holes, pockets, or voids within the material of the expandable element, such that the volume of the pellet increases. For example, an appropriate blowing agent can be an inert gas that is permeated into the expandable element under pressure. Such a blowing agent can be configured to expand in a plurality of locations within pellets 232 when the temperature of the pellet is increased from an ambient or initial temperature to a predetermined higher temperature, and the expanded gas forms holes, pockets, or voids within the pellet. A blowing agent, if present, can be applied to the expandable element prior to heating.

the blowing agent can be, for example, a gas or liquid, such as carbon dioxide, nitrogen, one or more hydrocarbons, water, and/or any other suitable physical and/or chemical blowing agent. The blowing agent can be introduced to pellets 232 under pressure when the blowing agent is a gas, so that the gas diffuses into the pellet to render it foamable.

Alternatively, or additionally, the blowing agent can comprise one or more expandable gas-filled microspheres that are embedded in the pellet when it is initially formed. Suitable microspheres can include expandable thermoplastic microspheres sold by AkzoNobel, Inc. of Chicago, Ill. under the proprietary name EXPANCEL.

Where expandable pellets 232 include a blowing agent, the blowing agent can be any appropriate substance capable of producing the desired degree of expansion of the resulting pellets. The blowing agent may include a physical blowing agent such as a chlorofluorocarbon, a hydrochlorofluorocarbon, a hydrocarbon, or liquid $CO_2$, among others. Alternatively or in addition, the blowing agent may include a chemical blowing agent selected to react with one or more components of the expandable pellets, such as isocyanate and water for polyurethane, azodicarbonamide for vinyl, hydrazine and other nitrogen-based materials for thermoplastic and elastomeric foams, and sodium bicarbonate for thermoplastic foams, among others.

Where the expandable pellets include a blowing agent, the blowing agent can include a foaming agent. Whereas the blowing agent can be selected to form a gas, the foaming agent can be a material that facilitates formation of a foam, such as for example, a surfactant. Suitable foaming agents can include sodium laureth sulfate, sodium lauryl ether sulfate (SLES), sodium lauryl sulfate (also known as sodium dodecyl sulfate or SDS), and ammonium lauryl sulfate (ALS), among others.

A suitable number of pellets 232 of expandable element 218 to be placed within volume 224 of constraining container 220 can include any number of pellets, provided that when expanded they are able to apply a positive pressure to the surface of uncured workpiece 205 sufficient to consolidate and shape the desired workpiece during curing, and that number is dependent upon the size of volume 224. That is, where the constraining container 220 fits more closely around the contours of assembly 212, fewer pellets 232 may be needed.

The number of expandable pellets 232 needed within volume 224 can, for example, be between 10 and 100 pellets, or between 100 and 500 pellets, or between 500 and 1000 pellets, or greater than 1000 pellets, depending on the application and workpiece assembly. Typically, a length of each expandable pellet 232 is less than one centimeter. Expandable pellets 232 can be substantially uniform in size, or can include pellets of different sizes.

During the process of curing uncured workpiece 205, expandable pellets 232 are made to expand from an unexpanded state to an expanded state. As described above, expandable pellets 232 can be configured to expand in response to heat applied to assembly 212 during curing. Expandable pellets 232 expand to at least partially fill volume 224, such that the expanded expandable pellets apply positive pressure to uncured workpiece 205 as it is disposed upon rigid form 214 and the workpiece is cured. FIG. 12 depicts expandable pellets 232 within volume 224 prior to expansion, while FIG. 13 depicts expanded pellets 236 within volume 224 after expansion.

Expandable pellets 232 can be formulated so that they are at least partially deformable after, during, and/or before expansion. A degree of deformability allows expandable pellets 232 to squeeze into small gaps that might otherwise exist between pellets, between pellets and inner surfaces 226, and/or between pellets and upper surface 228 of uncured workpiece 205. Filling these gaps allows the ensemble of expandable pellets 232 to present a substantially smooth surface to workpiece 205.

After workpiece 205 has been cured, constraining container 220 can be unsealed and/or opened as needed, and partially or fully expanded pellets 236 can be removed from volume 224. Although expanded pellets 236 are typically readily removed from constraining container 220 after workpiece 205 has been cured, in some examples expanded pellets 236 can remain expanded and tightly packed together after workpiece 205 has been cured and cooled, which may tend to impede their removal from container 220. Expandable pellets 232 can therefore be additionally configured in one or more ways to be more easily separated from workpiece 205, rigid form 214, and/or inner surfaces 226 of container 220.

For example, expandable pellets 232 can be configured so that the shape and/or size of the corresponding expanded pellets 236 can be changed when desired, so that they can be more readily extracted. For example, expandable pellets 232 can be configured to shrink when cooled, so that after workpiece 205 is cured and cooled, the pellets shrink in volume, thereby facilitating their removal from the container.

In another aspect, the expandable pellets 232 can be modified so as to minimize sintering (self-adhesion) upon heating and expansion. Alternatively, or in addition, expandable element 218 can be configured to minimize potential adhesion with the surfaces of the container and workpiece assembly, such as by coating pellets 232 with a suitable agent configured prevent adhesion of pellets to one another, and/or to facilitate separation of expanded pellets 236 from each other and/or from container 220 after heating.

In one aspect, a suitable agent for adding to expandable pellets 232 can include a lubricating agent, such that adding a lubricating agent to the expandable pellets decreases adhesion between pellets before and/or after volumetric expansion of the expandable pellets. A suitable lubricating agent is one that does not interfere with curing of workpiece 205, and prevents expanded pellets 236 from substantially adhering to one another, to the container, or to the components of the workpiece assembly. Suitable lubricating agents can include liquids, powders, or combinations thereof. When added as a powder, a suitable lubricating agent can comprise a nano-powder. Alternatively, or in addition, suitable lubricating agents can include silicon-based materials, fluorinated polymers, or other substantially inert substances. For example, a suitable lubricating agent can include polytetrafluoroethylene (PTFE) powder, PTFE nano-powder, silicone, perfluoropolyether (PFPE), perfluoroalkylether (PFAE), perfluoropolyalkylether (PFPAE), and/or the like. Such a lubricant can be applied to expandable pellets 232 before the expandable pellets are inserted into constraining container 220. Alternatively, or additionally, a suitable lubricant can be applied to expandable pellets 232 while they are disposed inside container 220. Coating at least some of expandable pellets 232 with a suitable lubricant can include mixing the lubricant with the plurality of pellets and/or pouring the lubricant over the plurality of pellets. Additionally, or alternatively, at least a subset of the plurality of expandable pellets 232 can be coated with a desired lubricant and then mixed in with a plurality of uncoated pellets.

Crystallinity and/or semi-crystallinity along the outer surfaces of expandable pellets 232 can help to prevent the pellets from sintering to each other. In one aspect, therefore, at least some of expandable pellets 232 can be configured, such as by preprocessing, to have regions of crystallinity along outer surfaces of the pellets, such that adding the thermally-activated expandable element includes adding a plurality of expandable pellets having surface regions of increased crystallinity in order to decrease adhesion between pellets before and/or after volumetric expansion of the expandable pellets.

Expandable pellets 232 can therefore be employed where outer surfaces of the pellets exhibit a high degree of crystallinity (e.g., a high percentage of the volume of regions of each pellet near the outer surface is crystalline). The crystallinity can be induced in expandable pellets 232 by controlling one or more factors including the material composition of the pellets, the production temperatures to which the pellets are heated during production, the times for which the pellet temperatures are maintained at the production temperatures during production, electric and/or magnetic fields applied during production, distribution of a blowing agent in the pellets, composition and/or concentration of blowing agent, and so on. The outer surfaces of pellets 232 can be crystalline before foaming, during foaming, and/or after foaming.

E. Illustrative Additional Elements and Associated Systems

1. Volumetrically Invariant Adjuncts

In some aspects, it may be advantageous to add one or more additional elements to the constraining container 220 with the workpiece assembly 212 and expandable pellets 232. For example, both the application of appropriate pressure to the workpiece as well as extraction of used and expanded pellets can be improved by the addition of one or more volumetrically invariant adjuncts 240. In this aspect, the curing process can include inserting a plurality of volumetrically invariant adjuncts into the internal volume 224 of the constraining container 220 with the expandable element 218.

As used herein, a volumetrically invariant adjunct is one that does not expand, or expands only minimally, when heated to the predetermined temperature at which expandable pellets undergo expansion. The volumetric invariance of a given substance can be quantified with reference to the coefficient of thermal expansion (CTE) of the substance. A substance with a higher CTE can be expected to expand to a greater degree than a substance having a lower CTE. The volumetric invariance of two substances can therefore be directly compared by comparing their respective CTE values.

For example, an adjunct composed of a steel alloys can be expected to undergo only minimal expansion during heating, as steel alloys have CTE values of $6.3$-$7.3 \times 10^{-6}$ inch/inch·F. The use of borosilicate glass con offer an adjunct that undergoes even less expansion, as borosilicate glass has a CTE of $2.2 \times 10^{-6}$ inch/inch·F. Aluminum metal, on the other hand, can undergo relatively greater expansion, having a CTE of $1.2$-$1.3 \times 10^{-5}$ inch/inch·F.

A volumetrically-invariant adjunct 240 is an adjunct that is selected to maintain substantially the same volume throughout the range of pressures expected to be generated within constraining container 220 during the curing process. In addition to being selected to exhibit no or only minimal expansion during heating, an appropriate volumetrically-invariant adjunct can be selected to be substantially noncompressible under the applied pressures expected to be generated within constraining container 220.

The addition of a one or more volumetrically invariant adjuncts 240 may permit the application of a desired pressure for curing workpiece 205 while using fewer expandable pellets 232, because as pellets 232 expand, the volumetrically invariant adjuncts will transfer any unbalanced pressures from one side of the adjunct to the other, with virtually no loss of pressure. In this way, fewer expandable pellets 232 can be sufficient to cure a desired workpiece. Additionally, volumetrically invariant adjunct 240 can be reusable, representing a further increased saving in materials used during the curing process.

Typically, volumetrically invariant adjunct can have a volume that is approximately the same size as a single expandable pellet 232. Alternatively the volumetrically invariant adjunct 240 can have a volume larger than a single expandable pellet 232. Volumetrically invariant adjunct 240 can have a volume between five times and ten times larger than a volume of one of expandable pellets 232, or a volume between ten times and twenty times larger than a volume of one of the pellets, or a volume more than twenty times larger than a volume of one of the pellets.

Volumetrically invariant adjuncts 240 can include any material that is insensitive to the conductions likely to occur with constraining container 220. For example, volumetrically invariant adjuncts 240 can include a glass, a ceramic, or a metal, or a combination thereof. Volumetrically invariant adjunct(s) 240 can be spherical, cylindrical, or any other shape suitable for addition to and removal from constraining container 220. In one aspect volumetrically invariant adjuncts 240 can include solid beads, spheres, or rods. In another aspect, volumetrically invariant adjuncts 240 can include hollow beads, spheres, or rods.

In one aspect, the curing process includes inserting a plurality of volumetrically invariant adjuncts into internal volume 224 of the constraining container 220 with expandable element 218, where the plurality of volumetrically invariant adjuncts include beads or rods.

Figure 14:
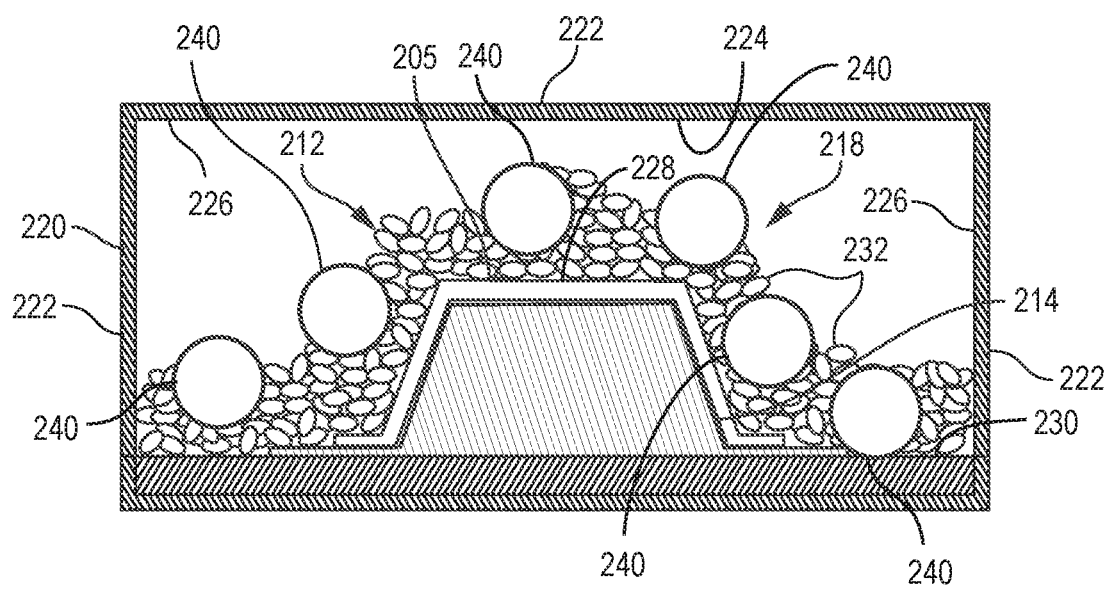
FIG. 14 depicts the addition of multiple volumetrically invariant adjuncts to the workpiece assembly and constraining container of FIG. 12.

As shown schematically in FIG. 14, prior to curing workpiece assembly 200, volumetrically invariant adjuncts 240 and unexpanded expandable pellets 232 are inserted into volume 224 of constraining container 220. The position of volumetrically invariant adjuncts 240 within volume 224 can be selected so that some expandable pellets 232 are disposed between any volumetrically invariant adjunct and upper surface 228 of workpiece 205 during curing, as if a substantially noncompressible volumetrically invariant adjunct were instead pushed against portions of workpiece 205 during curing, the volumetrically invariant adjunct can undesirably deform workpiece 205. Volumetrically invariant adjuncts 240 can provide additional surfaces for expandable pellets 232 to push against as they expand, which can benefit the distribution of pressure throughout volume 224 (e.g., by making the pressure distribution more uniform throughout the volume, and/or within selected portions of the volume).

Figure 15:
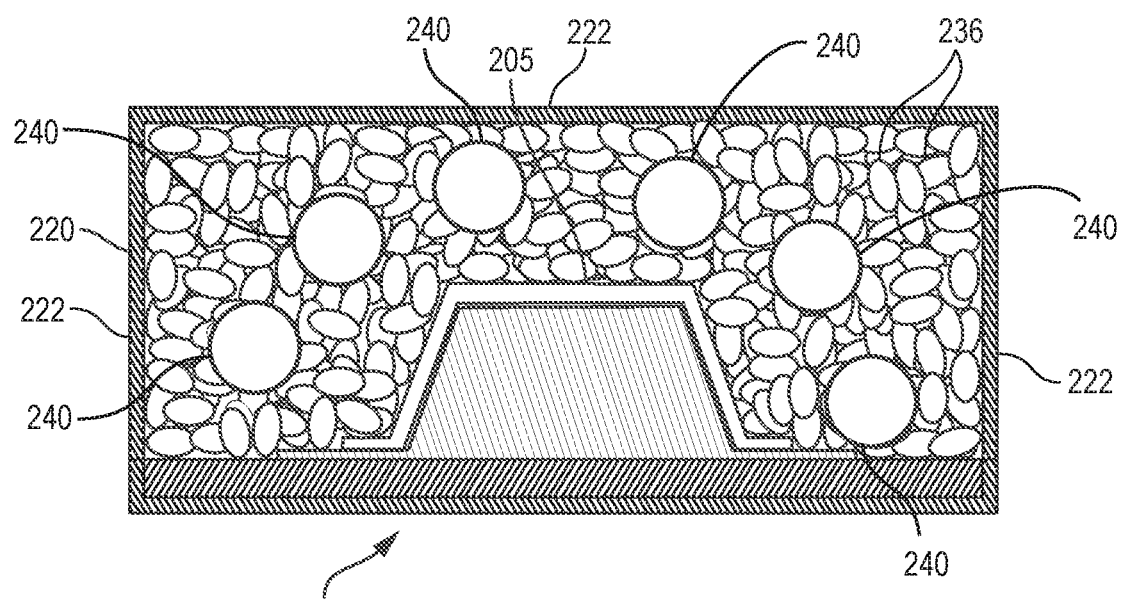
FIG. 15 is a cross-sectional view of the workpiece assembly and constraining container of FIG. 14 after expansion of the expandable pellets.

FIG. 15 schematically depicts workpiece assembly 212 after curing and prior to removal of expanded pellets 236, with pellets 236 having expanded to push against the volumetrically invariant adjuncts 240, inner surfaces 226 of container 220, and the outer/upper surfaces of workpiece 205. During and/or prior to curing of workpiece 205, the presence of volumetrically invariant adjuncts 240 can help push expandable pellets 232 into edge portions, corners, crevices, pockets, and/or narrow portions of volume 224.

2. Contractible Elements

Alternatively, or in addition, the addition of a contractible element 242 to the interior of constraining container 220 along with expandable pellets 232 can provide additional and advantageous results. In this aspect, the curing process can include inserting a contractible element into the internal volume 224 of constraining container 220 with the expandable element, where the contractible element can be configured to volumetrically contract when a predetermined change is produced in an attribute of the contractible element. Although depicted schematically as spheres or cylinders in FIGS. 16 and 17, a suitable contractible element may have any shape, size or geometry that facilitates the manipulation of the contractible element (i.e., handling, shipping, and adding the contractible element to constraining container 220).

Typically, contractible element 242 can be configured to shrink when cooled from a heated curing temperature (e.g., a temperature achieved during curing of workpiece 205) to an ambient temperature, or a temperature otherwise lower compared to curing temperatures. Contractible element 242 can be larger in volume than a single one of expandable pellets 232. For example, contractible element 242 can have a volume between five times and ten times larger than a volume of one of expandable pellets 232, or a volume between ten times and twenty times larger than a volume of one of the pellets, or a volume more than twenty times larger than a volume of one of the pellets.

Figure 16:
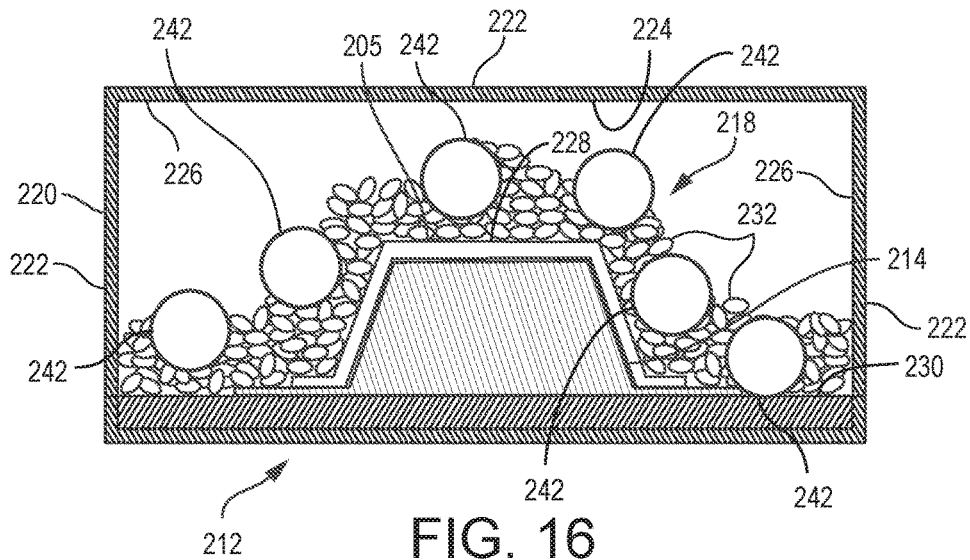
FIG. 16 is a cross-sectional view of the workpiece assembly and constraining container of FIG. 12 with the addition of an illustrative contractible element.

As shown schematically in FIG. 16, prior to curing workpiece 205, contractible element 242 and unexpanded expandable pellets 232 are inserted into volume 224. The position of contractible element 242 within volume 224 can be selected so that some expandable pellets 232 are disposed between each contractible element and the upper/outer surface of workpiece 205 during curing of the workpiece. If contractible element 242 were instead pushed against portions of workpiece 205 during curing, the contractible element can undesirably deform the workpiece unless it is configured to conform to the walls of container 220 when expanded. Contractible element 242 can provide a surface for expandable pellets 232 to push against as they expand, which can benefit the distribution of pressure throughout volume 224 (e.g., by making the pressure distribution more uniform throughout the volume, and/or within selected portions of the volume).

Figure 17:
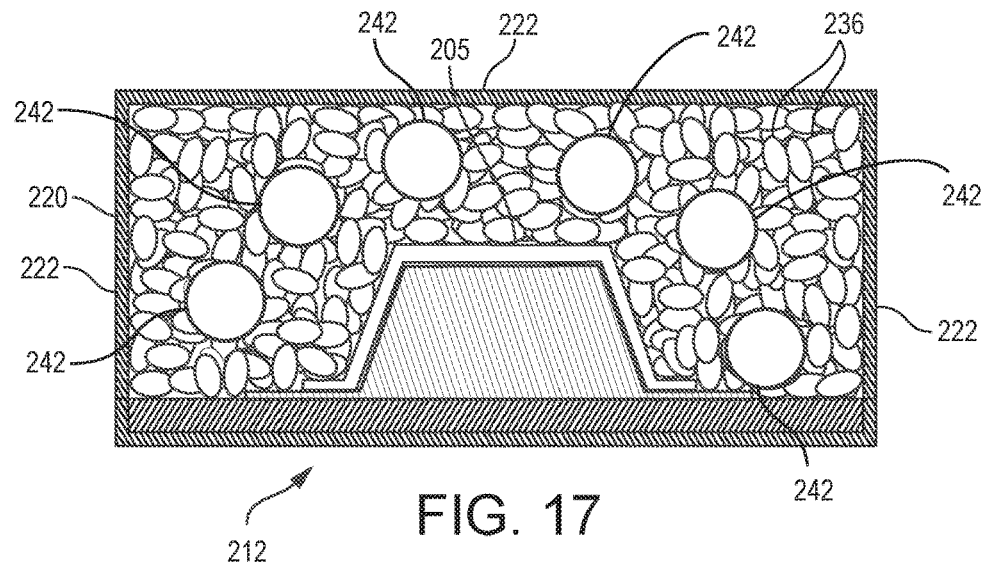
FIG. 17 is a cross-sectional view of the workpiece assembly and constraining container of FIG. 16 after expansion of the expandable pellets

FIG. 17 schematically depicts workpiece assembly 212 after curing and prior to cooling contractible element 242, with pellets 236 having expanded to push against the contractible elements and surfaces of assembly 212. During and/or prior to curing of workpiece 205, contractible elements 242 can help push expandable pellets 232 into edge portions, corners, crevices, pockets, and/or narrow portions of volume 224. Contractible elements 242 can be configured to expand during the curing process, or to begin the curing process at their maximal volume, and then contract after the curing process is complete.

Figure 18:
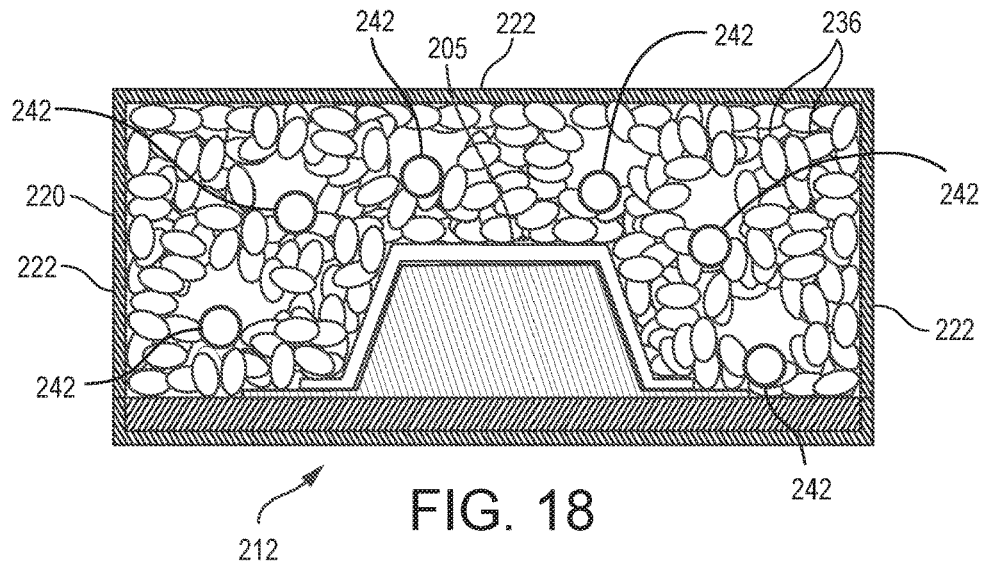
FIG. 18 is a cross-sectional view of the workpiece assembly and constraining container of FIG. 17 after the contractible element has been decreased in volume.

FIG. 18 schematically depicts assembly 212 after curing and after contractible element 242 has been reduced in volume (e.g., by cooling and/or deflation). Where contractible element 242 is configured to shrink upon cooling, reducing contractible element 242 in volume can include cooling the contractible element with a cooling mechanism (e.g., one or more fans, water chillers, thermoelectric coolers, etc.). Additionally, or alternatively, contractible element 242 can be allowed to cool naturally toward an ambient temperature. As shown in FIG. 18 when shrunken, contractible element 242 can fit loosely within volume 224 and/or within the plurality of expanded pellets 236 within volume 224, and therefore can be extracted from the constraining container 220 relatively easily. Typically, contractible element 242 can be removed from container 220< and then the tightly packed expanded pellets 236 are removed. Removing contractible element 242 leaves yet additional space within volume 224, allowing expanded pellets 236 to move more easily and therefore to be extracted more easily. Alternatively, contractible element 242 and expanded pellets 236 can be removed substantially simultaneously, or at least some of the pellets can be removed prior to removal of the contractible element.

In one aspect, external surfaces of contractible element 242 can be configured to stick to expanded pellets 236, such that at least some of the expanded pellets 236 are removed from volume 224 along with the contractible element 242 when the contractible element is removed from the constraining container 220. For example, surfaces of contractible element 242 can include one or more adhesives, high-friction materials, and/or shapes (e.g., ribbing, indentations, and/or relief patterns) configured to capture one or more expanded pellets 236 such that the captured pellets can be more readily removed along with the contractible element.

Contractible element 242 can include a solid material configured to contract when cooled from a heated curing temperature of the curing process to an ambient or other temperature lower than the curing temperature. For example, contractible element 242 can include a metal material. In examples in which at least a portion of constraining container 220 is elongate, for example in order to accommodate an elongate workpiece, such as an uncured aircraft stiffener workpiece, contractible element 242 can comprise a metal rod positioned longitudinally within volume 224. Where contractible element 242 is substantially elongate, the cross-sectional shape of the element can be circular. Additionally, or alternatively, contractible element 242 can have a different cross-sectional shape, such as oblong, square, triangular, hexagonal, polygonal, and/or irregular. Contractible element 242 can be a solid and/or hollow object having a spherical, planar, rectangular, conical, and/or irregular shape.

Figure 19:
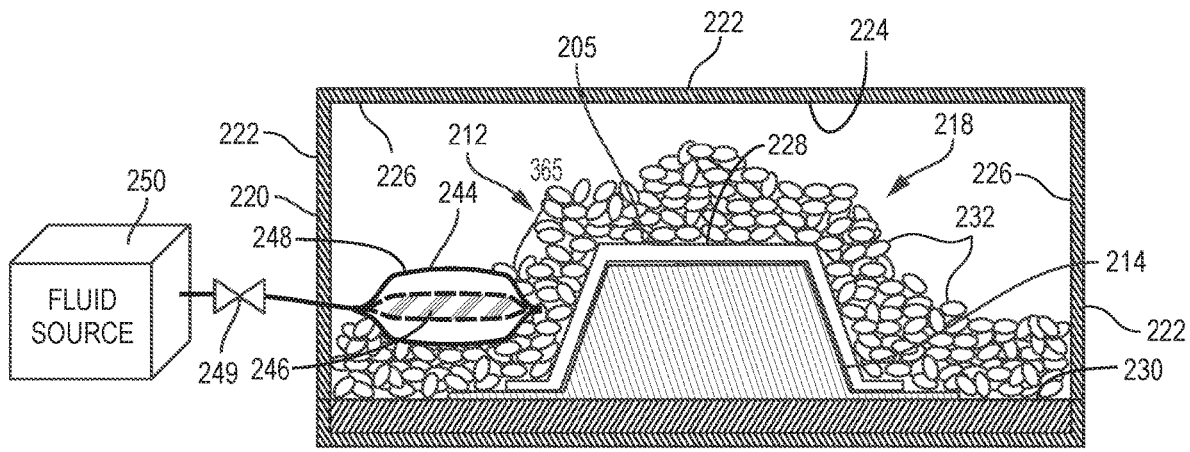
FIG. 19 is a cross-sectional view of the workpiece assembly and constraining container of FIG. 12 with the addition of an alternative contractible element that includes a bladder.

In an alternative aspect, contractible element 242 can comprise a bladder 244 (see FIG. 19). Bladder 244 (also referred to as a balloon) can contain a fluid 246, and can be configured to be used in conjunction with expandable pellets 232 in the manner described in the associated description above.

Fluid 246 can be confined within one or more bladder walls 248 comprising an elastic material (e.g., silicone). The constituents of fluid 246 and/or bladder walls 248 can be selected to achieve a desired volume and/or pressure of bladder 244 at the temperatures associated with curing workpiece 205. Fluid 246 can include, without limitation, a liquid, a gas, a super-critical fluid, or a combination thereof. Where contractible element 242 includes a bladder, the bladder can be a sealed bladder and fluid 246 contained therein can be configured to expand and contract as the fluid within expands and contracts, and in particular bladder 244 and fluid 246 can be configured as a contractible element such that the volume of bladder 244 can be reduced when cooled from the curing temperature to a lower or ambient temperature.

Alternatively, or in addition, the volume of bladder 244 can be reduced by deflation, such as by puncturing one or more walls 248 of bladder 244. In examples in which bladder 244 is deflated by puncturing, the bladder can be disposable, and/or can be repairable for reuse.

Alternatively, or in addition, bladder 244 can be configured to be opened to allow an input or egress of fluid 246, to control the volume of the bladder. For example, bladder 244 can be coupled to a valve 249 that can be configured to be closed to retain fluid 246 within the bladder, opened to allow fluid 246 to exit the bladder, or alternatively valve 249 can be configured to be in fluid communication with a source 250 of fluid 246, such that additional fluid 246 can be added to bladder 244 to achieve a desired bladder volume.

Fluid source 250 can include a reservoir for holding fluid 246 and/or a pump for pumping fluid 246 into or out of bladder 244. Adjusting the volume and/or pressure of fluid 246 within bladder 244 allows the pressure exerted by the bladder on adjacent portions of expandable element 218, expandable pellets 232, and/or assembly 212 to be selectively adjusted without directly adjusting the temperature of the bladder or the fluid within the bladder.

In one aspect, bladder 244 and/or valve 249 can be configured to not be in fluid communication with source 250 during curing of workpiece 205. For example, bladder 244 can be at least partially filled with fluid 246 and then disconnected from fluid source 250 prior to inserting the bladder into volume 224 of container 220. Alternatively, or additionally, bladder 244 can be inserted into volume 224 and at least partially filled with fluid 246 while inside the container, and then disconnected from fluid source 250 prior to curing workpiece 205.

Although useful as a contractible element, the combination of fluid source 250, valve 249, and bladder 244 can alternatively or additionally be used to supplement the pressure applied by expandable element 218. That is, fluid 246 can be added to bladder 244 to enlarge bladder 244 and apply additional pressure to workpiece 205. Alternatively, or in addition, bladder 244 can be disposed between expandable element 218 and workpiece 205, so that the pressure applied by expandable element 218 is applied more uniformly to workpiece 205.

Bladder 244 can alternatively or additionally be at least partially filled with a foaming agent configured to expand when heated or release a quantity of gas having sufficient pressure and/or volume to apply a predetermined pressure to inner surface 226 of constraining container 220. Accordingly, bladder 244 can be an alternative example of an expandable element 218.

2. Additional Pellets

Expandable pellets 232 can be combined with a plurality of additional pellets that, while also expandable, are configured to expand to a lesser degree than expandable pellets 232 when heated to a predetermined temperature. Expanding less than expandable pellets 232 when heated to the predetermined temperature can include substantially not expanding when heated to the predetermined temperature (e.g., having substantially the same volume at the predetermined temperature as at an ambient temperature lower than the predetermined temperature.) For example, the additional pellets can have a coefficient of thermal expansion that is less than ten percent of a coefficient of thermal expansion of the expandable pellets. A mixture of expandable pellets 232 and such additional pellets can facilitate the extraction of expanded pellets 236 from constraining container 220.

Alternatively, or in addition, expandable pellets 232 can be combined with a plurality of additional pellets configured to shrink when cooled from the heated curing temperature toward an ambient temperature. Such contractible additional pellets are an example of contractible element 242, described above.

3. Pellet Extraction Systems

In those cases where the geometry of constraining container 220 can hinder the removal of expanded pellets 236, a variety of approaches can be employed to facilitate the extraction of expanded pellets 236 from volume 224 of container 220, such as using magnetically attractable beads in cooperation with a magnetically attractable bead extraction system. For example, magnetically attractable beads can include steel beads, and a complementary magnetically attractable element to aid in removing the magnetically attractable beads can be a permanent magnet.

Alternatively or in addition, a pressurized fluid extraction system can be employed to extract expanded pellets 236 from container 220. A pressurized fluid extraction system can include a pressurized fluid source configured to force a pressurized fluid into container 220 to flush expanded pellets 236 out of the interior of constraining container 220. The pressurized fluid can comprise any suitable fluid, such as an inert gas, air, and/or any other suitable gas or liquid.

Alternatively or in addition, a vacuum extraction system can be configured to extract expanded pellets 236 from volume 224 of constraining container 220. A vacuum extraction system can include a vacuum source configured to create a region of low gas pressure and/or partial vacuum adjacent to pull expanded pellets 236 out of constraining container 220, and further include a receptacle configured to collect the expanded pellets.

4. Bagged Expandable Pellets

Adding the expandable element 218 to the internal volume 224 of the constraining container 220 can include adding a plurality of thermally-expandable pellets 232 to the internal volume of the constraining container while the pellets are retained within a flexible bag.

In this aspect, expandable pellets 232 can be prepackaged into portions by placing a predetermined amount of expandable pellets 232 within a flexible sack or bag 251, where the bags are configured to be added directly to internal volume 224 of constraining container 220. Typically, the composition of bag 251 is selected so that the bag can withstand the conditions under which workpiece 205 is cured, as well as withstanding the internal pressures created upon expansion of pellets 232.

The principle advantages offered by bagged expandable pellets include the substantially greater simplicity of handling the pellets, both before and after expansion. Bagged expandable pellets 232 can be more readily portioned out at a job site, and can be more easily transported to where at the job site they are needed. Additionally, the amount of foaming agent included in the expandable pellets or the pre-impregnation of expandable pellets can be metered to a certain dosage, which when combined with metering of bag contents with a known amount of expandable pellets can facilitate calculations for an appropriate amount of expandable pellets 232, and thereby enhance the production rate of workpiece assembly curing.

Addition of expandable pellets to a constraining container can include adding one or more bags of expandable pellets to the constraining container before container 220 is sealed and the workpiece cured. Then, after curing is complete, the resulting expanded pellets 236 can be readily removed from container 220 by removing the now expanded bags and their contents from the container.

Figure 20:
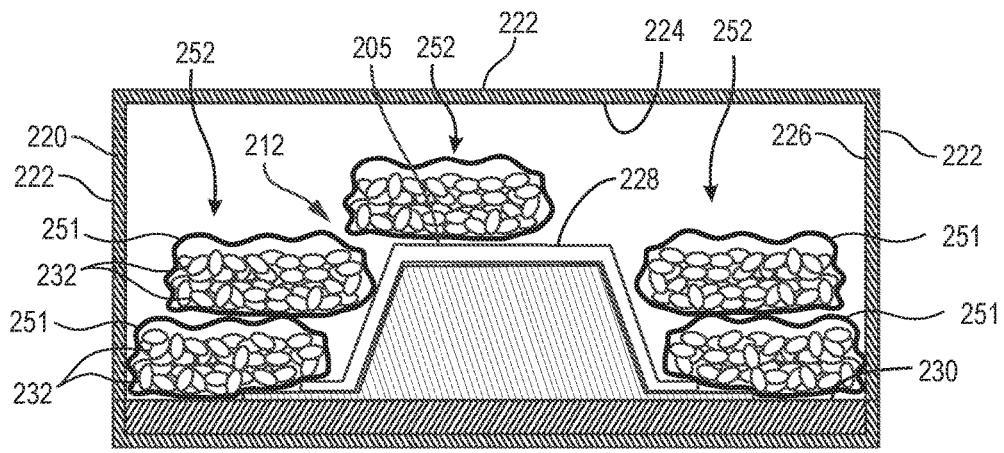
FIG. 20 is a cross-sectional view of the workpiece assembly and constraining container of FIG. 11 with the addition of an expandable element in the form of expandable pellets retained within multiple bags.

FIG. 20 schematically depicts a plurality of bag assemblies 252, comprising bags 251 that are at least partially filled with expandable pellets 232. Bag assemblies 252 are shown disposed within constraining container 220 with assembly 212. A variety of bags 251 can be used to construct bag assemblies 252. Such bags 251 can be configured to contain expandable pellets 232 and/or another type of expandable element 218, and are additionally configured to permit the expandable pellets to expand (e.g., to apply a predetermined pressure to interior surfaces of an internal volume containing the bag, as described above). Bag 251 can be selected so that it simply provides sufficient internal volume that the full expansion of expandable pellets 232 within bag 251 is accommodated. Alternatively, or in addition, the material of bag 251 can be selected to be partly or wholly expandable (stretchable) itself, so that the expansion of expandable pellets 232 can be accommodated by bag 251.

Figure 21:
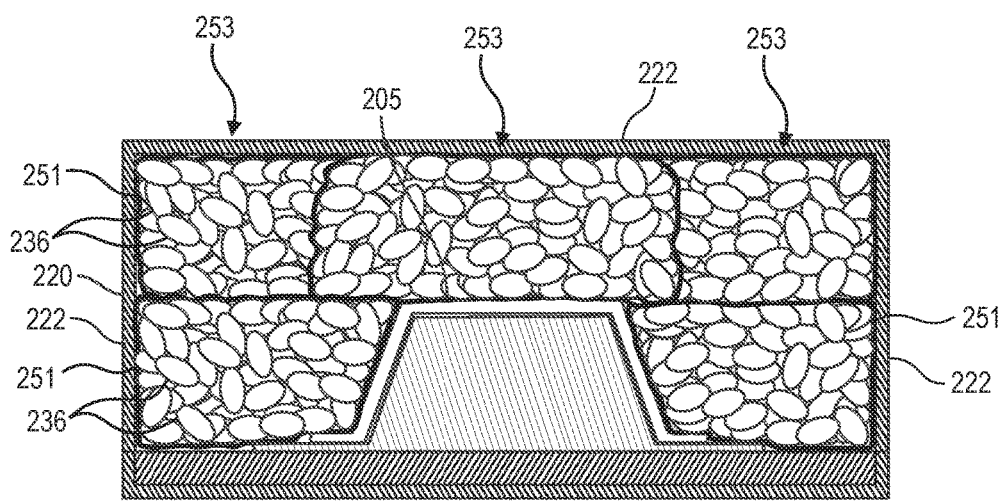
FIG. 21 is a cross-sectional view of the workpiece assembly and constraining container of FIG. 20 after expansion of the expandable pellets within the multiple bags.

FIG. 21 depicts the constraining container 220 of FIG. 20 after workpiece 205 has been cured. Volume 224 of constraining container 220 is substantially filled with bag assemblies 253, which comprise bags 251 that now enclose expanded pellets 236. The expanded pellets 236 can be extracted from volume 224 of constraining container 220 by opening the container and removing expanded bag assemblies 253 from the container while some or all of the expanded pellets 236 remain contained in bag 251. Where expanded bag assemblies 253 are removed from container 220 intact, with expanded pellets 236 remaining confined within bag 251, no clean-up of spilled or lost pellets is required. However, expanded pellets 236 can alternatively be removed from constraining container 220 by opening one or more bag assemblies 253 and extracting the expanded pellets 236 from bag 251. In order to facilitate the removal of expanded pellets 236 from bag 251, the walls of bag 251 can include a hatch, door, zipper, and/or any other closure assembly configured to be opened and closed again without damaging bag 251.

F. Heating Procedures and Materials

The various manufacturing processes for manufacturing a composite workpiece as described herein include heating, both to effectively cure the engineered composite workpiece, and, where the expandable element is configured to undergo expansion upon a predetermined increase in temperature, to expand the expandable element so as to create adequate pressure to cure the engineered composite workpiece.

Heating the thermally-activated expandable element to at least the predetermined temperature within the internal volume 224 of the constraining container 220 can include externally heating the constraining container. The uncured composite workpiece can be satisfactorily cured without the requirement of an autoclave, simplifying the curing process, as any method of heating conventionally used in manufacturing can be used to heat container 220 and its contents.

Constraining container 220, or one of its component parts, can be vibrated during the curing process, in order to help settle the contents of the constraining container and apply pressure to workpiece 205 more uniformly.

Although the presently described processes do not require an autoclave to apply pressure to the composite workpiece, container 220 can optionally be heated to a desired temperature using an industrial oven, kiln, or furnace that is relies upon combustion, electrical resistance, induction, solar, or geothermal heating, among others. Other heat transfer techniques, such as circulating heated fluid around the container, can also be useful for the present processes.

The disclosed processes can be particularly useful when incorporating heating materials within the constraining container 220 itself, as doing so can eliminate the requirement for external heating of constraining container 220. In this aspect, curing the composite material can include adding a heat-generating substance 254 to the internal volume 224 of the constraining container 220 with the thermally-activated expandable element; and heating the thermally-activated expandable element to at least the predetermined temperature using the heat-generating substance. The heat-generating substance 254 can be added to container 220 as discrete or distinct packages of material, or as pellets or particulates that can be mixed with a thermally-activated expandable element 218. In particular, where thermally-activated expandable element 218 includes expandable pellets 232, the heat-generating substance 254 can be added to container 220 in the form of similarly-shaped and sized pellets that can be mixed with pellets 232.

Heat-generating substance 254 can be selected to heat the thermally-activated expandable element to at least the predetermined temperature by undergoing an exothermic (heat-producing) change of state, or undergoing an exothermic (heat-producing) chemical reaction, as will be discussed below.

1. Exothermic Chemical Reaction

Where a heat-generating substance is selected to generate heat via an exothermic reaction, the substance typically includes the reactants required for the desired chemical reaction. The chemical reaction itself is typically energetically favored, and one or more of the reactants can therefore be isolated from the others, to prevent the reaction from proceeding until heating is desirable. The reaction is typically substantially self-sustaining, so that upon initiation by intermixing the necessary reactants, the reaction will proceed until complete.

A variety of appropriate heat-generating chemical reactions can be utilized for the purposes of heating the expandable element described herein, including the following exemplary illustrations.

One reaction typically used for flameless heating is the reaction of calcium oxide (or quicklime) with water. Calcium oxide reacts vigorously with water to produce heat, and this reaction is already used for self-heating food containers. Dry calcium oxide and water are combined, typically by piercing a wall or membrane between compartments enclosing the reactants. The exothermic reaction then proceeds, with an enthalpy of reaction of −64.8 kJ/mol:

$$CaO(s) + H_2O(aq) \rightarrow Ca(OH)_2(s) \quad \Delta H = -64.8 \text{ kJ/mol}$$

The combination of one mole of calcium oxide with one mole of water would therefore yield −64.8 kJ of energy in the form of heat. Using the molecular weights for calcium oxide (56.1 grams/mol) and water (18.0 grams/mol), we can calculate that 74.1 grams of combined reactants would be needed to generate 64.8 kJ of heat energy. If the reaction were carried out by adding excess water to the calcium oxide, the water would act as both reactant and solvent, and in addition serve as a heat transfer medium. That is, the reaction would heat the water, and the heated water could be used to heat expandable element 218.

For the purposes of illustration, a heat-generating packet that employs the calcium oxide-water reaction to generate heat might include 56.1 grams of dry calcium oxide, with 268 grams of water (or 268 mL of water) in a separate chamber. When combined, for example by piercing the membrane between the two chambers, the reaction will consume 18.0 grams of water, and the remaining 250 grams of water will be heated by the 64.8 kJ of energy released by the reaction.

The specific heat of liquid water is relatively high, at 4,182 J/K/Kg (Joules/degree Kelvin/Kg), but the addition of 64.8 kJ to 250 grams of water will raise the temperature of the 250 grams of water by 62 degrees Celsius. That is, if the water was initially at 20 degrees Celsius, and assuming no loss of heat to the environment, the water would be heated to approximately 82 degrees Celsius, or 180 degrees Fahrenheit. In addition to its heating capabilities, this reaction has the additional advantage of using inexpensive reactants.

Further, although calcium oxide can be an irritant to skin, it is generally safe, and is sometimes even used as a dietary supplement.

An alternative heat-generating reaction is the reaction of magnesium metal and water to generate magnesium hydroxide and hydrogen gas. This reaction has been employed by the U.S. military to heat military rations using flameless ration heaters (or FRHs). The reaction is slow, however, and FRHs include metallic iron particles and sodium chloride to accelerate the reaction. An exemplary FRH utilizes 7.5 grams of powdered magnesium-iron alloy and 0.5 grams of salt, with the addition of 30 mL of water, to heat a 230 gram meal packet by 56 degrees Celsius (100 degrees Fahrenheit) in approximately 10 minutes. This corresponds to a release of approximately 50 kJoules of heat energy at about 80 watts.

Another alternative heat-generating reaction is the oxidation of iron with oxygen. Although the rusting of iron is typically not associated with heat generation, this reaction is used by some portable hand warmers. The sealed packets include moist, finely-divided iron particles, salt, and optionally appropriate catalysts for the reaction. The packets can additionally include activated charcoal and vermiculite, to help dilute the iron powder to slow the reaction, as well as diffusing the generated heat. When the sealed packet is opened, exposing the contents to oxygen, the packet can generate significant warmth for up to several hours, for some hand warmers up to 57 degrees Celsius (135 degrees Fahrenheit).

Yet another alternative heat-generating reaction is the reaction of copper sulfate with powdered zinc, with an enthalpy of reaction of approximately −200 kJ/mol.

Figure 22:
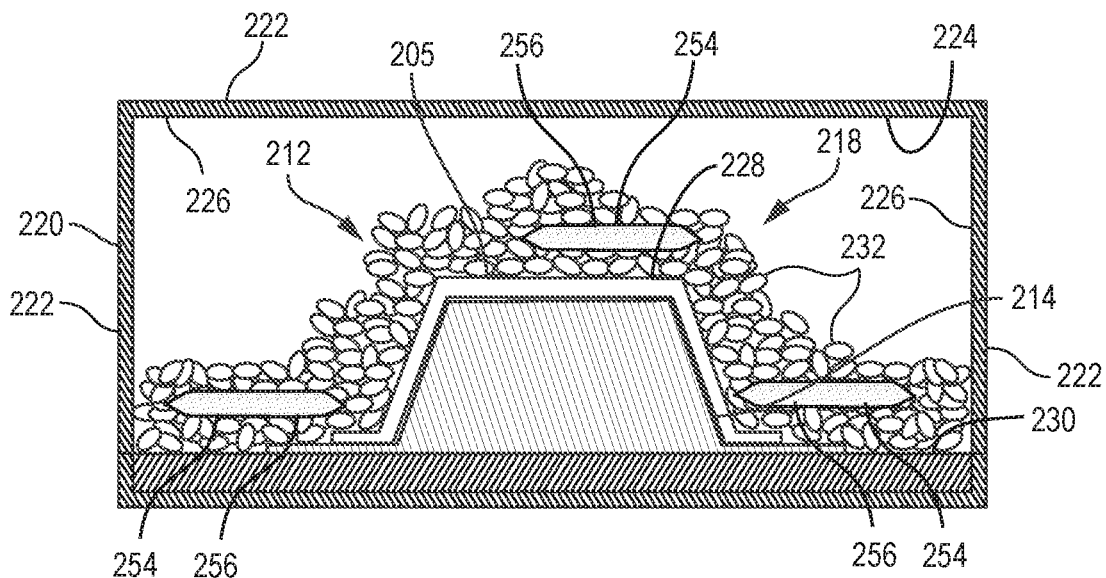
FIG. 22 is a cross-sectional view of the workpiece assembly and constraining container of FIG. 12 with the addition of a heat-generating substance in the form of multiple packets.

As discussed above expandable element 218 can have the form of a plurality of foamable pellets configured to foam when heated to at least a predetermined foaming temperature. In one aspect, the foamable pellets are configured so that the foaming process is itself exothermic, such that the foaming process contributes to the heating of the expandable element 218 as well as workpiece 205. In this aspect, an additional heating heat-generating substance may not be needed. Alternatively, the foamable pellets can be configured so that the foaming process is endothermic (heat-absorbing). A mixture of exothermic and endothermic foamable pellets may be used in order to fine-tune the temperatures reached within container 220.

Where heat-generating substance 254 relies upon an exothermic chemical reaction, the substance can be added to the constraining container 220 as individual packets or packages 256 of the reactants, which can be activated by mixing or combining two or more components of the packet. Packets 256 can be layered with the expandable element 218, arranged to be adjacent the composite workpiece 205, or dispersed within volume 224 of container 220, as shown in FIG. 22.

Figure 23:
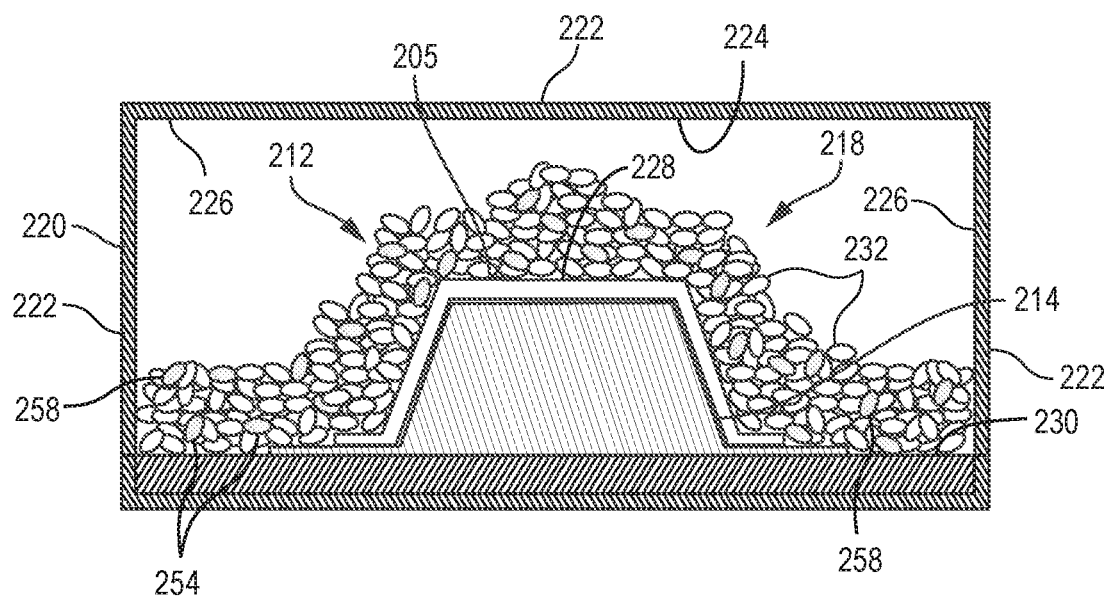
FIG. 23 is a cross-sectional view of the workpiece assembly and constraining container of FIG. 12 with the addition of a heat-generating substance in the form of multiple pellets.

Alternatively, or in addition, heat-generating substance 254 can include a reactant that reacts with an additional component, such as oxygen or water, to produce heat. In this aspect the heat-generating substance can be opened or unsealed and then added with the expanding element 218 to container 220. The heat-generating substance 254 can be added to container 220 in the form of pellets 258 which can be similar to, or distinct from, expandable pellets 232 in size and shape, as depicted in FIG. 23.

If desired or needed, any required additional component for the heat-generating reaction can also be added to container 220, for example by the addition of a reagent solution containing the additional component to volume 224 of container 220, either before or after the container is sealed. In one aspect, the heat-generating substance undergoes an exothermic reaction with water, and water is added to container 220 prior to sealing the container. In another aspect, a solution containing a necessary reactant is pumped into container 220 after it is sealed, to initiate the heat-generating reaction. In yet another aspect, where the heat-generating substance reacts with oxygen, container 220 can incorporate sufficient ventilation that oxygen can reach the heat-generating substance while container 220 is closed, without compromising the integrity of container 220 to contain the pressures created by expandable element 218.

2. Exothermic Change of Phase

An alternative class of heat-generating substances suitable for the presently disclosed processes may not require a chemical reaction, but instead generates heat by undergoing a physical change of state. Depending on the thermodynamics of the specific molecular system, a solid undergoing dissolution in a solvent can release a significant amount of heat. Conversely, crystallization of a solid from a saturated solution can release useful heat energy.

For example, the dissolution of anhydrous calcium chloride is an exothermic process, and this system has been used in portable heating pads. Typically, an amount of anhydrous calcium chloride and a supply of water are contained in separate compartments, and the heating pad is activated by mixing the contents of the separate compartments, for example by squeezing the heating pad to rupture a membrane disposed between the compartments.

Similar to the illustrative calcium oxide-water based heating packet above, an illustrative heat-generating packet utilizing the dissolution of calcium chloride to generate heat might include 55.5 grams of dry calcium chloride (0.5 mol), separated from 200 mL of water in a separate chamber. The enthalpy of dissolution for calcium chloride is −82.8 kJ/mol, and the molecular weight of calcium chloride is 110.98 g/mol. When allowed to combine, for example by piercing a membrane between the two chambers, the calcium chloride will dissolve in the water, and the dissolution will generate 41.4 kJ of heat energy. Assuming ideal conditions where all of that energy is used to heat the 200 mL of water, and that the water is initially at 20 degrees Celsius, the water will reach a temperature of 70 degrees Celsius (158 degrees Fahrenheit).

A common alternative heating system includes a packet containing a supersaturated aqueous solution of sodium acetate. Crystallization of sodium acetate trihydrate can be initiated by flexing a small disc of notched ferrous metal within the solution, which creates a nucleation site for the sodium acetate. Crystallization then occurs very rapidly, and generates significant amounts of heat.

The sodium acetate crystallization system offers an additional advantage that it is completely reusable, as placing the packet containing the sodium acetate crystals in boiling water redissolves the sodium acetate in the water contained in the package. Permitting the packet to cool to room temperature recreates a supersaturated solution, and the packet can be used for heating again.

Where the heat-generating substance relies upon a change in phase to generate heat, the heat-generating substance can be added as an individual packet or packages of the phase-changing component, which can be activated by mixing or combining two or more components of the packet, or otherwise triggering a change in phase. The packets can be layered with the expandable element 218, arranged to be adjacent the composite workpiece 205, or dispersed throughout volume 224 of container 220, as shown for packets 256 in FIG. 22.

G. Illustrative Method of Manufacturing a Composite Workpiece

Figure 24:
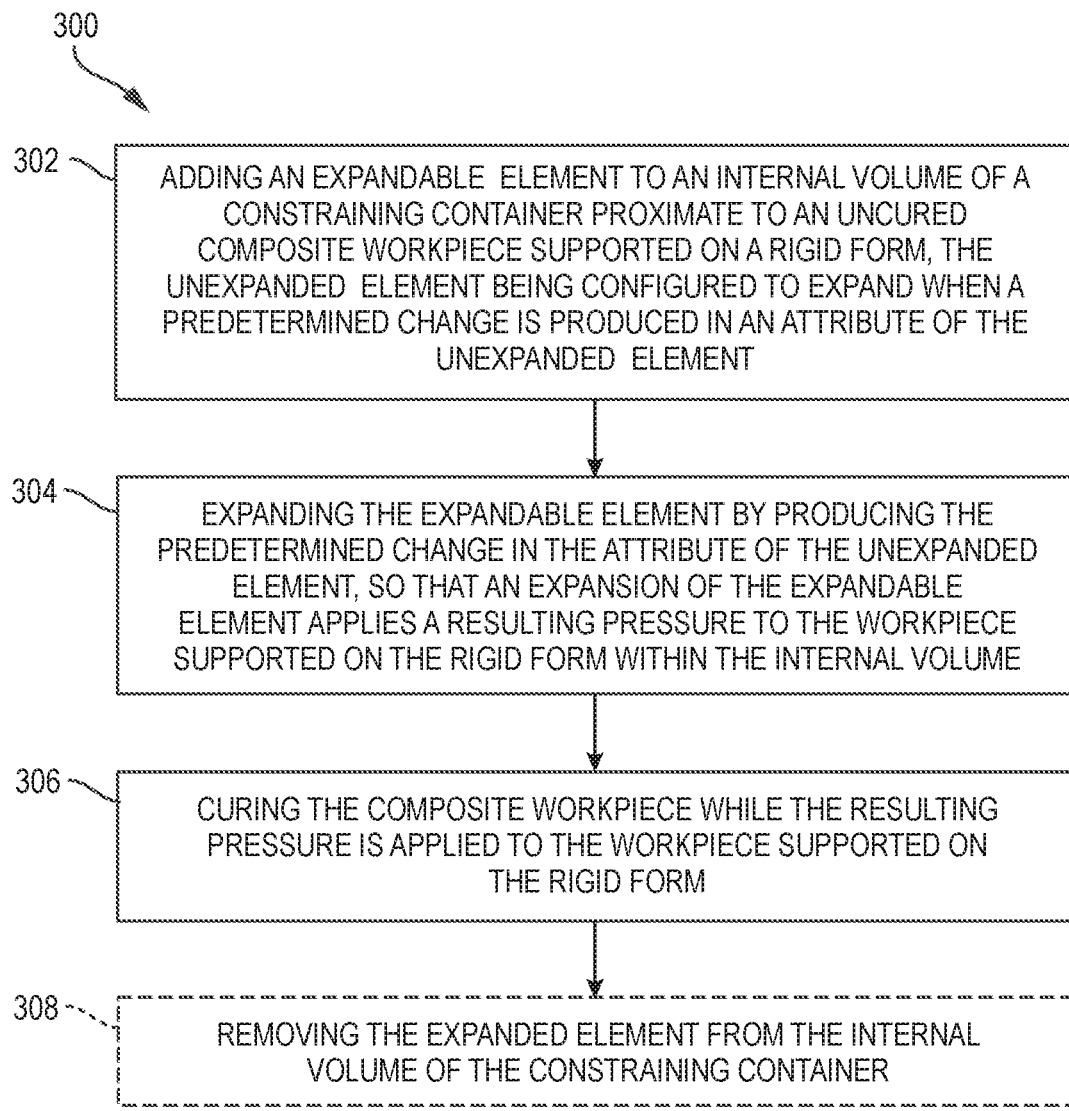
FIG. 24 is a flowchart depicting steps of an illustrative method for manufacturing a composite workpiece.

This section describes steps of an illustrative method of manufacturing a composite workpiece, as shown in flowchart 300 of FIG. 24. Expandable element 218 and/or associated systems can be utilized in the method steps described below. Where appropriate, reference can be made to components and systems that can be used in carrying out each step. These references are for illustration, and are not intended to limit the possible ways of carrying out any particular step of the method.

FIG. 24 is a flowchart illustrating steps performed in an illustrative method. Based on the present disclosure, it should be understood that additional steps can be performed, without departing from the present claims. Although various steps of flowchart 300 are described below and depicted in FIG. 24, the steps need not necessarily all be performed, and in some cases can be performed simultaneously or in a different order than the order shown.

The present illustrative method can include adding an expandable element to an internal volume of a constraining container proximate to an uncured composite workpiece supported on a rigid form, the unexpanded element being configured to expand when a predetermined change is produced in an attribute of the unexpanded element, as set out at step 302 of flowchart 300. The method can further include expanding the expandable element by producing the predetermined change in the attribute of the unexpanded element, so that an expansion of the expandable element applies a resulting pressure to the workpiece supported on the rigid form within the internal volume, as set out at step 304 of flowchart 300. The method can further include curing the composite workpiece while the resulting pressure is applied to the workpiece supported on the rigid form, as set out at step 306 of flowchart 300. Optionally, the illustrative method can further include removing the expanded element from the internal volume of the constraining container, as set out at step 308 of flowchart 300.

H. Illustrative Method of Manufacturing a Composite Workpiece

Figure 25:
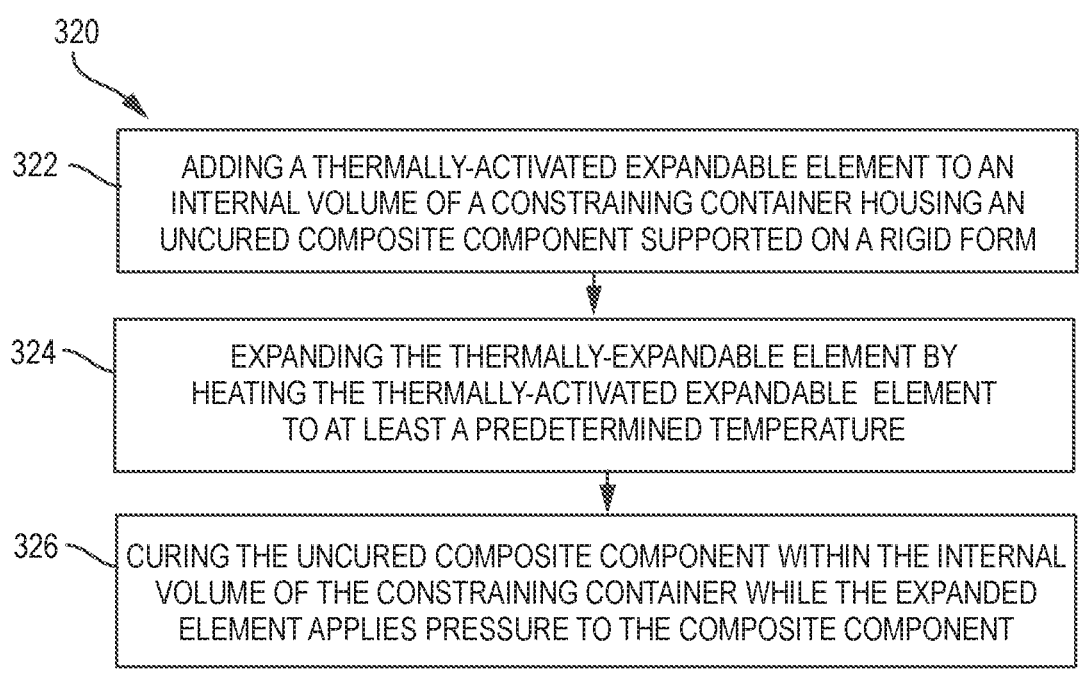
FIG. 25 is a flowchart depicting steps of an alternative illustrative method for manufacturing a composite workpiece.

This section describes steps of an illustrative method of manufacturing a composite workpiece, as shown in flowchart 320 of FIG. 25. Expandable element 218 and/or associated systems can be utilized in the method steps described below. Where appropriate, reference can be made to components and systems that can be used in carrying out each step. These references are for illustration, and are not intended to limit the possible ways of carrying out any particular step of the method.

FIG. 25 is a flowchart illustrating steps performed in an illustrative method. Based on the present disclosure, it should be understood that additional steps can be performed, without departing from the present claims. Although various steps of flowchart 320 are described below and depicted in FIG. 25, the steps need not necessarily all be performed, and in some cases can be performed simultaneously or in a different order than the order shown.

The illustrative method of flowchart 320 can include adding a thermally-activated expandable element to an internal volume of a constraining container housing an uncured composite component supported on a rigid form, as set out at step 322. The method can further include expanding the thermally-activated expandable element by heating the thermally-activated expandable element to at least a predetermined temperature, as set out at step 324 of flowchart 320. The method can further include curing the uncured composite component within the internal volume of the constraining container while the expanded element applies pressure to the uncured component, as set out at step 326 of flowchart 320.

I. Illustrative Combinations and Additional Examples

This section describes additional aspects and features of expandable tooling, presented without limitation as a series of paragraphs, some or all of which can be alphanumerically designated for clarity and efficiency. Each of these paragraphs can be combined with one or more other paragraphs, and/or with disclosure from elsewhere in this application in any suitable manner. Some of the paragraphs below expressly refer to and further limit other paragraphs, providing without limitation examples of some of the suitable combinations.

A1. A method of manufacturing a composite workpiece, comprising adding an expandable element to an internal volume of a constraining container proximate to an uncured composite workpiece supported on a rigid form, the unexpanded element being configured to expand when a predetermined change is produced in an attribute of the unexpanded element; expanding the expandable element by producing the predetermined change in the attribute of the unexpanded element, so that an expansion of the expandable element applies a resulting pressure to the workpiece supported on the rigid form within the internal volume; and curing the composite workpiece while the resulting pressure is applied to the workpiece supported on the rigid form.

A2. The method of paragraph A1, where adding the expandable element to the internal volume of the constraining container includes adding a thermally-activated expandable element to the internal volume of the constraining container, where the thermally-activated expandable element is configured to expand when the temperature of the element is raised to at least a predetermined temperature.

A3. The method of paragraph A2, where heating the thermally-activated expandable element to at least the predetermined temperature within the internal volume of the constraining container includes externally heating the constraining container.

A4. The method of paragraph A2, further comprising adding a heat-generating substance to the internal volume of the constraining container with the thermally-activated expandable element; and heating the thermally-activated expandable element to at least the predetermined temperature using the heat-generating substance.

A5. The method of paragraph A4, where the heat-generating substance is selected to heat the thermally-activated expandable element to at least the predetermined temperature by undergoing an exothermic change of state, or undergoing an exothermic chemical reaction.

A6. The method of paragraph A2, where adding the thermally-activated expandable element includes adding a plurality of expandable pellets, where the expandable pellets are configured to undergo volumetric expansion when heated to at least the predetermined temperature.

A7. The method of paragraph A6, further comprising adding a lubricating agent to the expandable pellets to decrease adhesion between pellets before and/or after volumetric expansion of the expandable pellets.

A8. The method of paragraph A2, where adding the thermally-activated expandable element includes adding a plurality of expandable pellets having surface regions of increased crystallinity in order to decrease adhesion between pellets before and/or after volumetric expansion of the expandable pellets.

A9. The method of paragraph A1, further comprising inserting a contractible element into the internal volume of the constraining container with the expandable element, the contractible element being configured to volumetrically contract when a predetermined change is produced in an attribute of the contractible element.

A10. The method of paragraph A1, further comprising inserting a plurality of volumetrically invariant adjuncts into the internal volume of the constraining container with the expandable element.

A11. The method of paragraph A10, where inserting the plurality of volumetrically invariant adjuncts into the internal volume of the constraining container includes combining a plurality of volumetrically invariant beads or rods with the expandable element.

A12. The method of paragraph A1, further comprising applying a removable barrier film to an outer surface of the uncured composite workpiece before adding the expandable element to the internal volume of the constraining container.

B1. A method of manufacturing a composite component, comprising adding a thermally-activated expandable element to an internal volume of a constraining container housing an uncured composite component supported on a rigid form; expanding the thermally-activated expandable element by heating the thermally-activated expandable element to at least a predetermined temperature; and curing the composite workpiece within the internal volume of the constraining container while the expanded element applies pressure to the workpiece to form the component.

B2. The method of paragraph B1, further comprising inserting a contractible element into the internal volume of the constraining container with the thermally-activated expandable element, the contractible element being configured to volumetrically contract when a predetermined change is produced in an attribute of the contractible element; effecting the predetermined change in the attribute of the contractible element; and removing the contracted element and the expanded element from the internal volume of the constraining container.

B3. The method of paragraph B2, where expanding the thermally-activated expandable element by heating the thermally-activated expandable element to at least a predetermined temperature includes producing a predetermined pressure against the uncured composite workpiece when the thermally-activated expandable element is heated to at least the predetermined temperature.

B4. The method of paragraph B2, where adding the thermally-activated expandable element to the internal volume of the constraining container includes adding a plurality of thermally-expandable pellets to the internal volume of the constraining container while the pellets are retained within a flexible bag.

B5. The method of paragraph B2, where heating the thermally-activated expandable element includes heating the thermally-activated expandable element with a heat-generating substance added to the internal volume of the constraining container.

B6. The method of paragraph B5, where heating the thermally-activated expandable element includes heating the thermally-activated expandable element with a heat-generating substance while the heat-generating substance is undergoing an exothermic change of state, or undergoing an exothermic chemical reaction.

B7. The method of paragraph B1, where the composite component is a composite aircraft component.

B8. The method of paragraph B1, where the step of curing the composite workpiece within the internal volume of the constraining container is carried out in the absence of an autoclave.

Advantages, Features, and Benefits

The different examples of the expandable tooling systems and methods described herein provide several advantages over known solutions for applying positive pressure to a composite workpiece assembly while curing the assembly. For example, illustrative examples described herein allow tooling that is adaptive to various shapes, and typically does not need to be tailored to specific dimensions and/or geometry of the composite workpiece assembly. Furthermore, illustrative embodiments and examples described herein allow for manufacturing composite parts having a complicated shape, without manufacturing custom tooling having a corresponding complicated shape. Accordingly, the high cost of manufacturing the complicated tooling is saved.

Additionally, and among other benefits, illustrative examples described herein allow tooling that is tailorable to the pressure and temperatures associated with curing a specific composite workpiece assembly.

Additionally, and among other benefits, illustrative examples described herein allow tooling that is environmentally preferred. For example, expandable foam pellets can comprise a recyclable material such as polyethylene terephthalate (PET), a material from renewable resources, and/or a biodegradable material such as polylactide (PLA).

Additionally, and among other benefits, the expandable tooling systems and methods described herein facilitates the "out-of-autoclave" curing of composite workpieces. Appropriate constraining containers can be fabricated on site for conducting the present methods at a desired location, saving on the cost of providing an industrial autoclave, the cost of transporting workpieces to and from the industrial autoclave, and preventing the types of bottlenecks in production flow that can typically result when production resources are limited in number but widely required.

No known system or device can perform these functions. However, not all examples described herein provide the same advantages or the same degree of advantage.

CONCLUSION

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A method of manufacturing a composite workpiece, comprising:
adding foamable pellets to an internal volume of a constraining container proximate to an uncured composite workpiece supported on a rigid form, the foamable pellets being configured to expand when a predetermined change is produced in an attribute of the foamable pellets;
expanding the foamable pellets by producing the predetermined change in the attribute of the foamable pellets, so that an expansion of the foamable pellets applies a resulting pressure to the workpiece supported on the rigid form within the internal volume; and
curing the composite workpiece while the resulting pressure is applied to the workpiece supported on the rigid form.

2. The method of claim 1, wherein adding the foamable pellets to the internal volume of the constraining container includes adding thermally-activated foamable pellets to the internal volume of the constraining container, where the thermally-activated foamable pellets are configured to expand when a temperature of the thermally-activated foamable pellets is raised to at least a predetermined temperature.

3. The method of claim 2, further comprising heating the thermally-activated foamable pellets to at least the predetermined temperature within the internal volume of the constraining container, wherein heating includes externally heating the constraining container.

4. The method of claim 2, further comprising adding a heat-generating substance to the internal volume of the constraining container with the thermally-activated foamable pellets; and heating the thermally-activated foamable pellets to at least the predetermined temperature using the heat-generating substance.

5. The method of claim 4, wherein the heat-generating substance is selected to heat the thermally-activated foamable pellets to at least the predetermined temperature by undergoing an exothermic change of state, or undergoing an exothermic chemical reaction.

6. The method of claim 2, further comprising adding a lubricating agent to the thermally-activated foamable pellets to decrease adhesion between pellets before and/or after expanding the foamable pellets.

7. The method of claim 2, wherein adding the thermally-activated foamable pellets includes adding a plurality of foamable pellets having surface regions of increased crystallinity in order to decrease adhesion between pellets before and/or after expanding the foamable pellets.

8. The method of claim 1, further comprising:
inserting a contractible element into the internal volume of the constraining container with the foamable pellets, the contractible element being configured to volumetrically contract when a predetermined change is produced in an attribute of the contractible element.

9. The method of claim 1, further comprising inserting a plurality of volumetrically invariant adjuncts into the internal volume of the constraining container with the foamable pellets.

10. The method of claim 9, wherein inserting the plurality of volumetrically invariant adjuncts into the internal volume of the constraining container includes combining a plurality of volumetrically invariant beads or rods with the foamable pellets.

11. The method of claim 1, further comprising applying a removable barrier film to an outer surface of the uncured composite workpiece before adding the foamable pellets to the internal volume of the constraining container.

12. The method of claim 2, further comprising heating the thermally-activated foamable pellets to at least the predetermined temperature.

13. The method of claim 8, further comprising:
effecting the predetermined change in the attribute of the contractible element; and
removing the contracted element and the foamable pellets from the internal volume of the constraining container.

14. The method of claim 1, wherein expanding the foamable pellets includes producing a predetermined pressure against the uncured composite workpiece when the predetermined change is produced in the attribute of the foamable pellets.

15. The method of claim 1, wherein adding foamable pellets includes adding a plurality of the foamable pellets to the internal volume of the constraining container while the plurality of the foamable pellets are retained within a flexible bag.

16. The method of claim 1, wherein the composite workpiece is a composite aircraft component.

17. The method of claim 1, wherein curing the composite workpiece is carried out in the absence of an autoclave.

18. The method of claim 1, wherein adding foamable pellets includes adding foamable pellets comprising a thermoplastic material.

19. The method of claim 18, wherein adding foamable pellets comprising a thermoplastic material includes adding foamable pellets treated with a blowing agent.

20. The method of claim 18, wherein expanding the foamable pellets includes heating the foamable pellets above a glass transition temperature thereof.

* * * * *